US011463617B2

(12) United States Patent
Ogawa

(10) Patent No.: US 11,463,617 B2
(45) Date of Patent: Oct. 4, 2022

(54) INFORMATION PROCESSING APPARATUS, INFORMATION PROCESSING SYSTEM, IMAGE CAPTURING APPARATUS, INFORMATION PROCESSING METHOD, AND MEMORY

(71) Applicant: CANON KABUSHIKI KAISHA, Tokyo (JP)

(72) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 332 days.

(21) Appl. No.: 16/657,926

(22) Filed: Oct. 18, 2019

(65) Prior Publication Data

US 2020/0137300 A1   Apr. 30, 2020

(30) Foreign Application Priority Data

Oct. 25, 2018   (JP) .............................. JP2018-201266
Sep. 27, 2019  (JP) .............................. JP2019-176640

(51) Int. Cl.
*H04N 5/232* (2006.01)
*G06K 9/62* (2022.01)
*G06T 7/80* (2017.01)
*G06N 3/063* (2006.01)
(Continued)

(52) U.S. Cl.
CPC ....... *H04N 5/23222* (2013.01); *G06K 9/6253* (2013.01); *G06K 9/6256* (2013.01); *G06N 3/04* (2013.01); *G06N 3/063* (2013.01); *G06N 3/08* (2013.01); *G06T 7/80* (2017.01); *H04N 5/23219* (2013.01); *G06T 2207/20081* (2013.01); *G06T 2207/20084* (2013.01); *H04N 5/23258* (2013.01)

(58) Field of Classification Search
CPC .......... H04N 5/23222; H04N 5/23219; H04N 5/23258; H04N 5/23299; H04N 5/23296; H04N 5/23245; G06K 9/6256; G06K 9/6253; G06K 9/6271; G06K 9/00221; G06K 9/20; G06K 9/4642; G06K 7/1439; G06K 7/10722; G06K 7/1413; G06K 7/10861; G06K 7/1482; G06K 17/0022; G06T 7/80; G06T 2207/20081; G06T 2207/20084; G06N 3/063; G06N 3/04; G06N 3/08; G06N 20/00; G06N 3/0454
See application file for complete search history.

(56) References Cited

U.S. PATENT DOCUMENTS

| | | | |
|---|---|---|---|
| 2009/0284621 A1* | 11/2009 | Oks ........................ | H04N 5/232 348/231.6 |
| 2014/0304582 A1* | 10/2014 | Bills ...................... | G06F 40/174 715/224 |
| 2015/0373236 A1* | 12/2015 | Thorn .................... | H04N 5/772 348/158 |

FOREIGN PATENT DOCUMENTS

| | | |
|---|---|---|
| JP | 2004-354251 A | 12/2004 |
| JP | 2012-252507 A | 12/2012 |
| JP | WO2014/030407 A1 | 7/2016 |

(Continued)

*Primary Examiner* — Lin Ye
*Assistant Examiner* — Tuan H Le
(74) *Attorney, Agent, or Firm* — Canon U.S.A., Inc., IP Division

(57) ABSTRACT

An information processing apparatus is provided which divides data for learning into first training data and second training data, stores the first training data and the second training data into a memory, and updates only the second training data without updating the first training data in a case where new characteristic data is obtained.

13 Claims, 16 Drawing Sheets

(51) Int. Cl.
*G06N 3/04* (2006.01)
*G06N 3/08* (2006.01)

(56) References Cited

FOREIGN PATENT DOCUMENTS

| | | |
|---|---|---|
| JP | 2016-536868 A | 11/2016 |
| JP | 2017-224184 A | 12/2017 |
| WO | 2014/030407 A1 | 2/2014 |

* cited by examiner

INFORMATION PROCESSING APPARATUS, INFORMATION PROCESSING SYSTEM, IMAGE CAPTURING APPARATUS, INFORMATION PROCESSING METHOD, AND MEMORY

BACKGROUND

Field

The present disclosure relates to an information processing apparatus that learns parameters for at least one of an image capturing operation and image processing.

Description of the Related Art

In a still image/moving image capturing process using an image capturing apparatus, such as a camera, a user determines an image capturing target while checking the target through a finder or the like and adjusts framing of an image to be captured while checking an image capturing status by himself/herself, to capture an image. Image capturing apparatuses that are used in such a manner include a function for detecting an error in a user operation and notifying the user of the detected error, or detecting an external environment and notifying the user that the detected external environment is not suitable for image capturing. In addition, a mechanism for controlling a camera to be brought into a state suitable for image capturing has heretofore been known.

In contrast to the image capturing apparatus that executes image capturing in response to a user operation, Japanese Unexamined Patent Application Publication No. 2016-536868 discusses a lifelog camera that periodically and continuously performs image capturing without receiving an image capturing instruction from a user. The lifelog camera is used in a state where the camera is worn on the body of a user with a strap or the like, and records, as a video image, a scene observed by the user in his/her daily life at regular time intervals. Image capturing using the lifelog camera is not performed at an intended timing, such as a timing when the user releases a shutter, but is performed at regular time intervals, which makes it possible to capture, as a video image, an unexpected moment in which an image is not normally captured.

However, when automatic image capturing is periodically performed in a state where the lifelog camera is worn on the body of a user, video images that are not desired by the user are acquired and video images of a moment desired by the user cannot be acquired.

Even if the lifelog camera includes a learning function and is capable of learning an image of a moment desired by the user and automatically capturing the image of the moment, a large amount of training data is required for the learning. Japanese Patent Application Laid-Open No. 2004-354251 discusses a defect inspection apparatus that inspects the presence or absence of a defect in an object by using a neural network.

By learning the user's preference using the neural network discussed in Japanese Patent Application Laid-Open No. 2004-354251, a camera can perform automatic image capturing at a timing when a composition desired by the user is obtained, or an image processing apparatus can perform processing on an image in accordance with the user's preference. As the learning processing is advanced, the user's preference can be more accurately reflected.

However, if the user's preference is learned using a large amount of training data, the learning result may place a disproportionate emphasis on the user's preference. In this case, it is difficult to perform automatic image capturing and process images with a generally preferable composition, which may deteriorate user-friendliness.

SUMMARY

According to an aspect of the present disclosure, an information processing apparatus includes a control circuit configured to access a memory storing training data to be used for a learning circuit to perform learning, and to update the training data. The memory stores first training data and second training data, the first training data and the second training data each including a plurality of pieces of characteristic data. The number of pieces of characteristic data included in the second training data has an upper limit. The control circuit uses characteristic data extracted from an image to update the second training data without updating the first training data.

Further features of the present disclosure will become apparent from the following description of exemplary embodiments with reference to the attached drawings.

DESCRIPTION OF THE EMBODIMENTS

<Configuration of Image Capturing Apparatus>

Figure 1A:
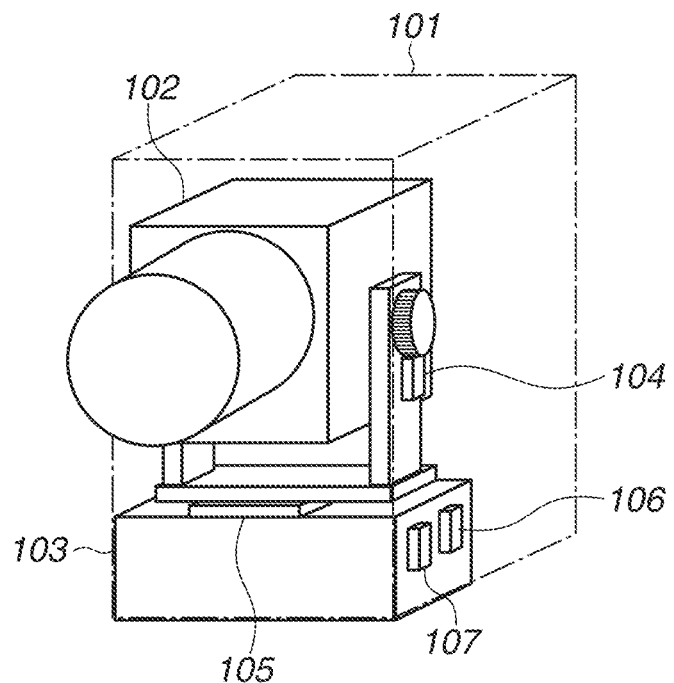
FIGS. 1A and 1B are diagrams schematically illustrating an image capturing apparatus according to a first exemplary embodiment.
Figure 1B:
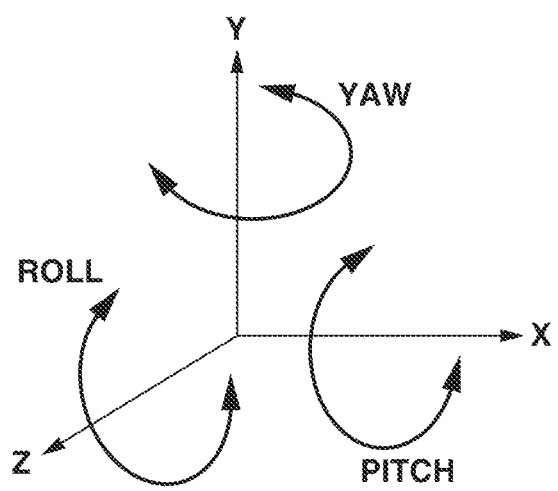

FIGS. 1A and 1B are diagrams schematically illustrating an image capturing apparatus as an information processing apparatus according to a first exemplary embodiment. The present disclosure is applicable not only to image capturing by a digital camera or a digital video camera, and also to image capturing apparatuses such as a monitoring camera, a web camera, a mobile phone, and a tablet terminal. In addition, the present disclosure is also applicable to a server and a personal computer which control the image capturing apparatuses described above and perform an analysis based on images received from the image capturing apparatuses, or an information processing system including a combination of an image capturing apparatus and a server. In the first exemplary embodiment, an image capturing apparatus including an image analysis function, an automatic image capturing function, and an image processing function will be described by way of example.

An image capturing apparatus 101 illustrated in FIG. 1A is provided with an operation member for operating a power supply switch (the operation member is hereinafter referred to as a power supply button, but instead a tap operation, a flick operation, a wipe operation, and the like on a touch panel may be used). A barrel 102, which is a housing including an image capturing lens group for image capturing and an image sensor, is attached to the image capturing apparatus 101, and is provided with a rotation mechanism for rotationally driving the barrel 102 with respect to a fixed portion 103. A tilt rotation portion 104 is a motor driving mechanism for rotating the barrel 102 in a pitch direction illustrated in FIG. 1B. A pan rotation unit 105 is a motor driving mechanism for rotating the barrel 102 in a yaw direction. Accordingly, the barrel 102 can be rotated in a direction along at least one axis. FIG. 1B illustrates definitions of axes at the position of the fixed portion 103. An angular velocity meter 106 and an accelerometer 107 are mounted on the fixed portion 103 of the image capturing apparatus 101. A vibration of the image capturing apparatus 101 is detected based on the angular velocity meter 106 and the accelerometer 107, and the tilt rotation portion 104 and the pan rotation unit 105 are rotationally driven based on a detected shake angle. With this configuration, a shake or tilt of the barrel 102, which is a movable portion, is corrected.

Figure 2:
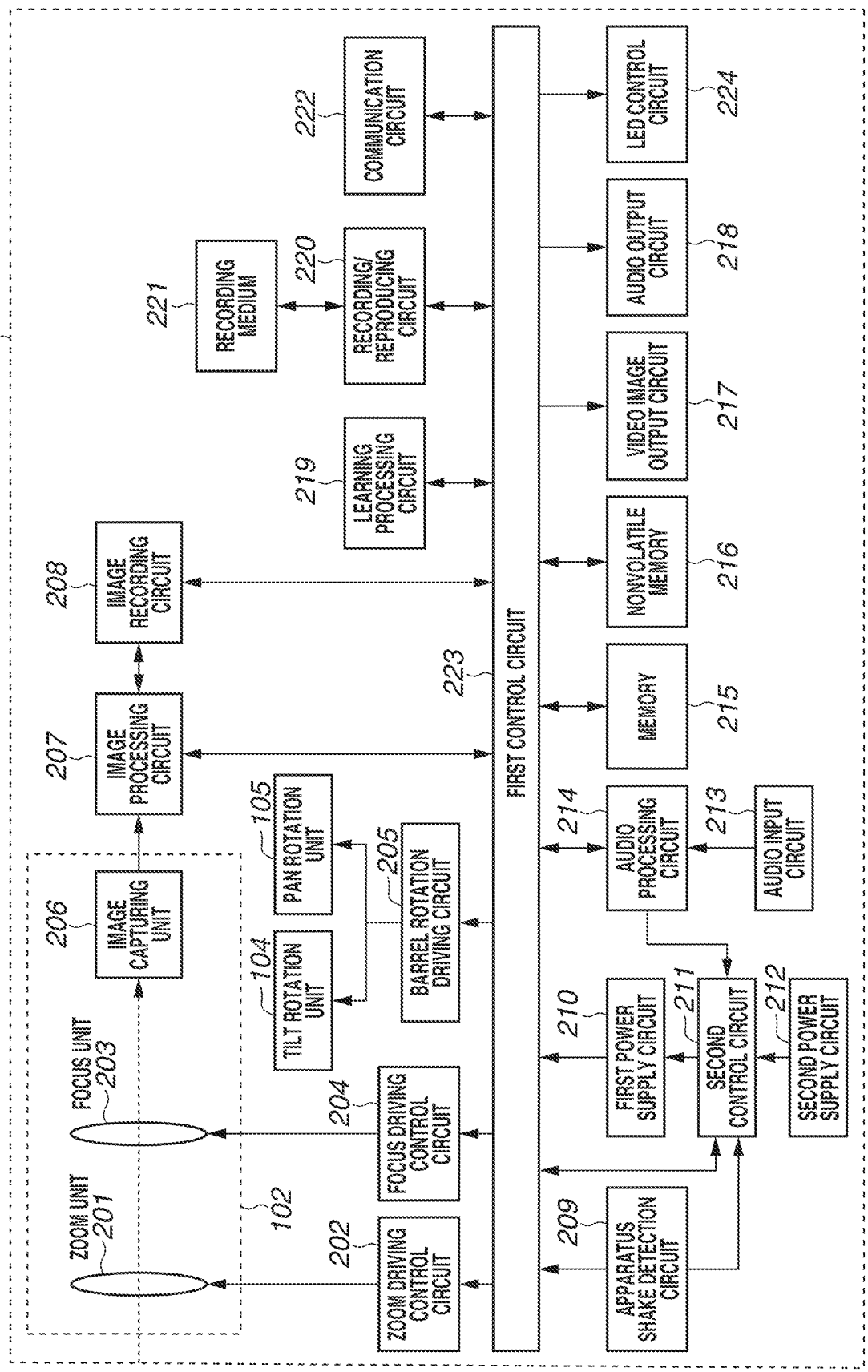
FIG. 2 is a block diagram illustrating a configuration example of the image capturing apparatus according to the first exemplary embodiment.

FIG. 2 is a block diagram illustrating a configuration example of the image capturing apparatus 101 according to the present exemplary embodiment.

Referring to FIG. 2, a first control circuit 223 includes a processor (e.g., a central processing unit (CPU), a graphics processing unit (GPU), a microprocessor, or a micro processing unit (MPU)) and a memory (e.g., a dynamic random access memory (DRAM) or a static RAM (SRAM)). These are used for controlling each block of the image capturing apparatus 101 by executing various types of processing, and for controlling data transfer between blocks. A nonvolatile memory (electrically erasable programmable read-only memory (EEPROM)) 216 is an electrically erasable/recordable memory and stores constants, programs, and the like for operation of the first control circuit 223.

A zoom unit 201 illustrated in FIG. 2 includes a zoom lens for magnification. A zoom driving control circuit 202 drives and controls the zoom unit 201. A focus unit 203 includes a lens for focus adjustment. A focus driving control circuit 204 drives and controls the focus unit 203.

An image capturing unit 206 includes an image sensor and an analog-to-digital (A/D) converter. The image sensor receives light traveling through each lens group, and outputs information about an electric charge corresponding to the light amount to an image processing circuit 207 as analog image data. The image processing circuit 207 is an arithmetic circuit having a plurality of arithmetic and logic units (ALUs) mounted thereon. The image processing circuit 207 applies image processing, such as distortion correction, white balance adjustment, and color interpolation processing, to digital image data output after A/D conversion, and outputs the digital image data subjected to the image processing. An image recording circuit 208 converts the digital image data output from the image processing circuit 207 into a recording format such as a Joint Photographic Experts Group (JPEG) format, and transmits the converted data to each of a memory 215 and a video image output circuit 217 to be described below.

A barrel rotation driving circuit 205 drives the tilt rotation portion 104 and the pan rotation unit 105, to drive the barrel 102 in a tilt direction and a pan direction.

On an apparatus shake detection circuit 209, for example, the angular velocity meter (gyroscope sensor) 106 that detects an angular velocity in three-axis directions of the image capturing apparatus 101 and the accelerometer (acceleration sensor) 107 that detects an acceleration in the three-axis directions of the image capturing apparatus 101 are mounted. The apparatus shake detection circuit 209 calculates a rotation angle of the image capturing apparatus 101, a shift amount of the image capturing apparatus 101, and the like based on detected signals.

An audio input circuit 213 acquires a surrounding audio signal of the image capturing apparatus 101 from a microphone, which is on the image capturing apparatus 101, converts an analog audio signal into a digital audio signal, and transmits the digital audio signal to an audio processing circuit 214. The audio processing circuit 214 performs audio processing, such as optimization processing, on the received digital audio signal. The audio signal processed by the audio processing circuit 214 is transmitted to the memory 215 by the first control circuit 223. The memory 215 temporarily stores an image signal obtained by the image processing circuit 207 and an audio signal obtained by the audio processing circuit 214.

The image processing circuit 207 reads out the image signal temporarily stored in the memory 215, performs, for example, encoding of the image signal, and generates a compressed image signal. The audio processing circuit 214 reads out the audio signal temporarily stored in the memory 215, performs, for example, encoding of the audio signal, and generates a compressed audio signal. The first control circuit 223 transmits the compressed image signal and the compressed audio signal to a recording/reproducing circuit 220.

The recording/reproducing circuit 220 records the compressed image signal generated by the image processing circuit 207, the compressed audio signal generated by the audio processing circuit 214, and control data and the like associated with image capturing on a recording medium 221. If the audio signal is not subjected to compression coding, the first control circuit 223 transmits, to the recording/reproducing circuit 220, the audio signal generated by the audio processing circuit 214 and the compressed image signal generated by the image processing circuit 207, and records the audio signal and the image signal on the recording medium 221.

The recording medium 221 may be a recording medium built in the image capturing apparatus 101, or a detachably mounted recording medium. The recording medium 221 can record various data, such as the compressed image signal, the compressed audio signal, and the audio signal, which are generated by the image capturing apparatus 101. A medium having a capacity larger than that of the nonvolatile memory 216 is generally used as the recording medium 221. Examples of the recording medium 221 include any type of recording media, such as a hard disk, an optical disk, a magneto-optical disk, a compact disc-recordable (CD-R), a digital versatile disc (DVD)-R, a magnetic tape, a nonvolatile semiconductor memory, and a flash memory.

The recording/reproducing circuit 220 reads out (reproduces) the compressed image signal, compressed audio signal, audio signal, various data, and programs recorded on the recording medium 221. The first control circuit 223 transmits the read compressed image signal and compressed audio signal to the image processing circuit 207 and the audio processing circuit 214, respectively. The image processing circuit 207 and the audio processing circuit 214 temporarily store the compressed image signal and the compressed audio signal to the memory 215, decodes the signals in a predetermined procedure, and transmits the decoded signals to the video image output circuit 217 and an audio output circuit 218.

In the audio input circuit 213, a plurality of microphones is mounted on the image capturing apparatus 101. The audio processing circuit 214 is capable of detecting a sound direction on a plane on which the plurality of microphones is installed. The audio processing circuit 214 is used for search or automatic image capturing as described below. Further, the audio processing circuit 214 detects a specific audio command. As the audio command, some commands registered in advance can be used and a specific voice can be registered in the image capturing apparatus 101 by a user. In addition, the audio processing circuit 214 may perform sound scene recognition. In the sound scene recognition, a sound scene determination is performed by a network that has learned scenes in advance by machine learning based on a large amount of audio data. For example, a network for detecting a specific scene, such as "a burst of cheers", "a burst of applause", or "emitting a voice", is set in the audio processing circuit 214. When a specific sound scene or a specific audio command is detected, a detection trigger signal is output to the first control circuit 223 or a second control circuit 211.

The second control circuit 211, which is provided separately from the first control circuit 223 that controls the entire main system of the image capturing apparatus 10, controls a power supply of the first control circuit 223.

A first power supply circuit 210 supplies power for operating the first control circuit 223, and the second power supply circuit 212 supplies power for operating the second control circuit 211. When the power supply button on the image capturing apparatus 101 is pressed, power is first supplied to both the first control circuit 223 and the second control circuit 211. As described below, the first control circuit 223 controls turning OFF of the power supply to the first power supply circuit 210. Also during a period in which the first control circuit 223 is not operating, the second control circuit 211 operates and receives information from the apparatus shake detection circuit 209 and the audio processing circuit 214. The second control circuit 211 is configured to perform processing for determining whether to start the first control circuit 223 based on various input information and to send a power supply instruction to the first power supply circuit 210 if it is determined that the first control circuit 223 is started.

The audio output circuit 218 outputs a preset audio pattern from a speaker built in the image capturing apparatus 101, for example, during image capturing.

A light-emitting diode (LED) control circuit 224 controls an LED, which is provided on the image capturing apparatus 101, in a preset lighting or blinking pattern, for example, during image capturing.

The video image output circuit 217 is composed of, for example, a video image output terminal, and transmits an image signal to display a video image on a connected external display or the like. The audio output circuit 218 and the video image output circuit 217 may be coupled together to form a single terminal such as a high-definition multimedia interface (HDMI®) terminal.

A communication circuit 222 establishes a communication between the image capturing apparatus 101 and an external device, and transmits and receives data such as an audio signal, an image signal, a compressed audio signal, and a compressed image signal. The communication circuit 222 also receives an image capturing start or end command and a control signal associated with image capturing processing, such as pan/tilt driving and zoom driving, and drives the image capturing apparatus 101 in response to an instruction from an external device that can communicate with the image capturing apparatus 101. Further, information such as various parameters associated with learning processing performed by a learning processing circuit 219 to be described below, is transmitted or received between the image capturing apparatus 101 and the external device. The communication circuit 222 is a wireless communication module such as an infrared communication module, a Bluetooth® communication module, a wireless local area network (LAN) communication module, a wireless universal serial bus (USB), or a global positioning system (GPS) receiver.

<Configuration of External Communication Device>

Figure 3:
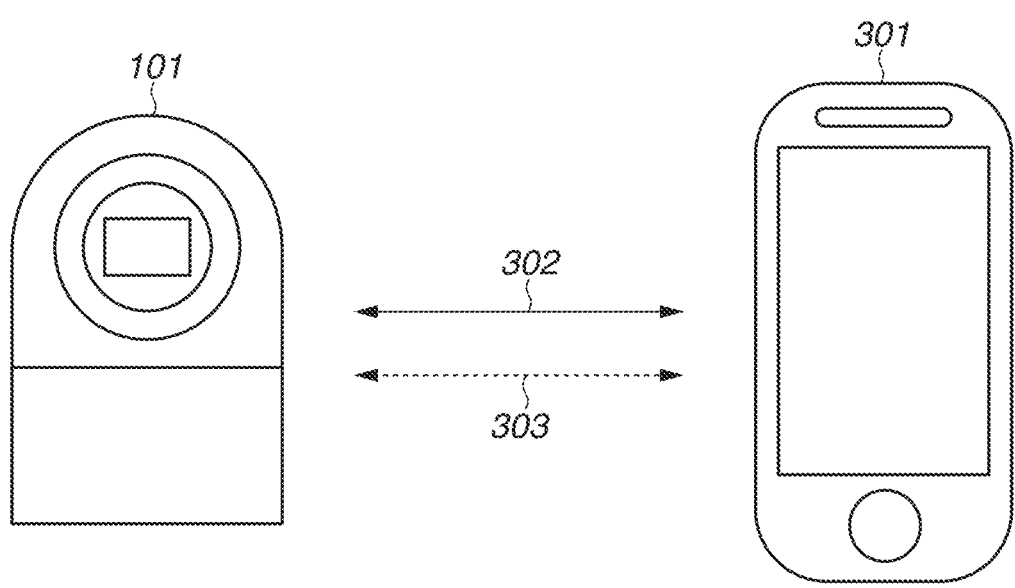
FIG. 3 are diagrams illustrating a configuration example of a wireless communication system in which the image capturing apparatus and an external device communicate with each other.

FIG. 3 is a diagram illustrating a configuration example of a wireless communication system in which the image capturing apparatus 101 and an external device 301 communicate with each other. The image capturing apparatus 101 is a digital camera including an image capturing function, and the external device 301 is a smart device including a Bluetooth® communication module and a wireless LAN communication module.

The image capturing apparatus 101 and the external device (smartdevice) 301 can communicate with each other by communication 302 using a wireless LAN in conformity with, for example, Institute of Electrical and Electronics Engineers (IEEE) 802.11 standard series and using communication 303, such as Bluetooth® Low Energy, which has a subordinate-superior relationship between, for example, a control station and a subordinate station. The wireless LAN and Bluetooth® Low Energy are examples of the communication method. Each communication apparatus includes two or more communication functions. Other communication methods may be used, for example, in a case in which one of the communication functions that perform communication in the relationship between the control station and the subordinate station can control the other communication function. In such a case, a first communication using the wireless LAN or the like enables higher-speed communication than a second communication using Bluetooth® Low Energy or the like, without losing the generality. Additionally, the second communication has at least one of the following features. That is, power consumption in the second communication is less than power consumption in the first communication, or a communicable distance of the second communication is shorter than a communicable distance of the first communication.

Figure 4:
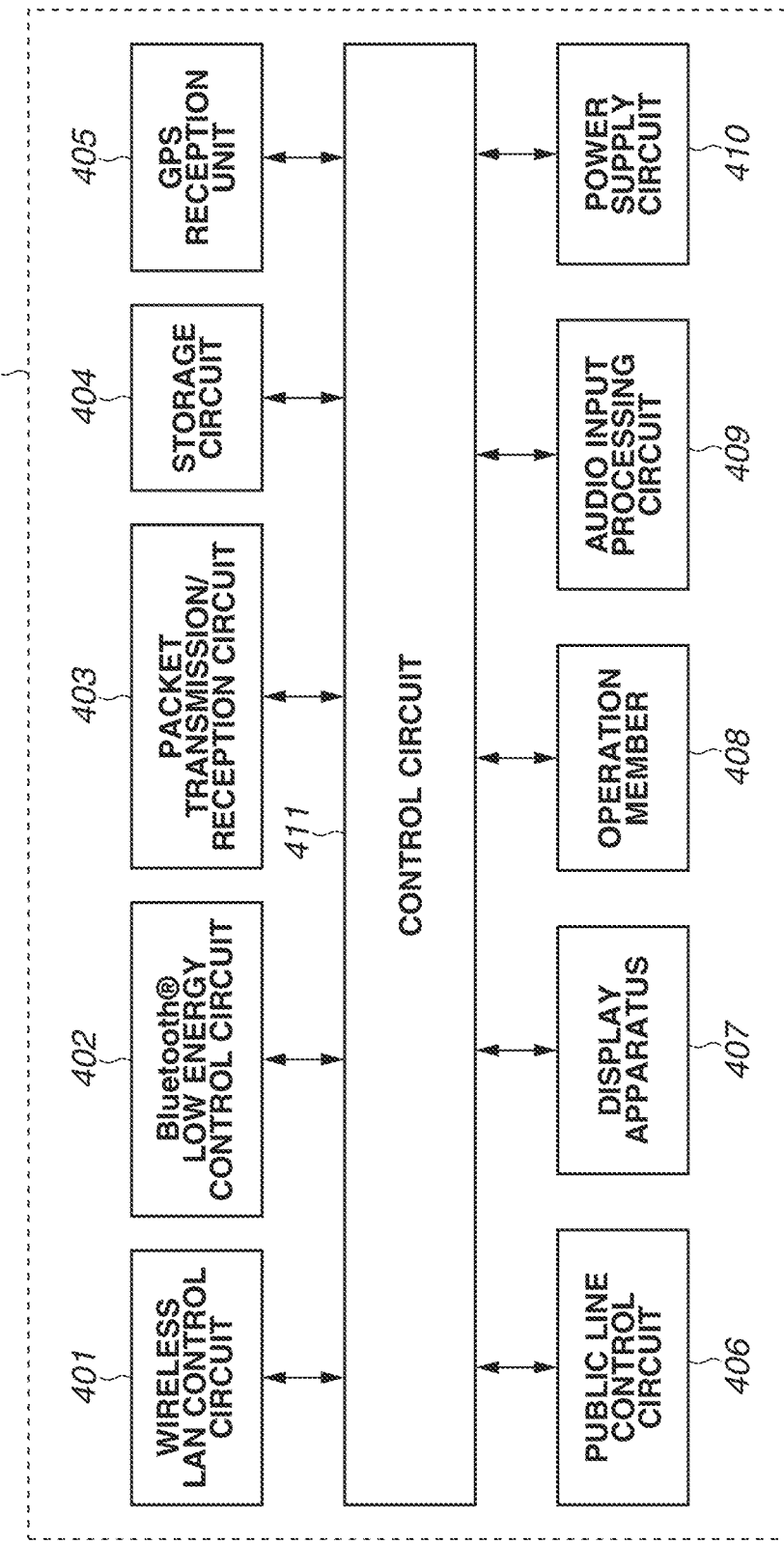
FIG. 4 is a diagram illustrating a configuration example of the external device.

The configuration of the external device 301 will be described with reference to FIG. 4.

The external device 301 includes, for example, a wireless LAN control circuit 401 for wireless LAN, a Bluetooth® Low Energy control circuit 402 for Bluetooth® Low Energy, and a public line control circuit 406 for public wireless communication. The external device 301 also includes a packet transmission/reception circuit 403. The wireless LAN control circuit 401 performs radio frequency (RF) control for wireless LAN, communication processing, and protocol processing associated with communication using a wireless LAN and a driver for performing various control operations by communication using the wireless LAN in conformity with IEEE 802.11 standard series. The Bluetooth® Low Energy control circuit 402 performs RF control for Bluetooth® Low Energy, communication processing, and protocol processing associated with communication using Bluetooth® Low Energy and a driver for performing various control operations by communication using Bluetooth® Low Energy. The public line control circuit 406 performs RF control for public wireless communication, communication processing, and protocol processing associated with public wireless communication and a driver for performing various control operations using public wireless communication. The public wireless communication is in conformity with, for example, International Multimedia Telecommunication (IMT) or Long Term Evolution (LTE) standards. The packet transmission/reception circuit 403 performs processing for executing at least one of transmission and reception of packets associated with communication using the wireless LAN and by Bluetooth® Low Energy and public wireless communication. The present exemplary embodiment illustrates an example in which the external device 301 executes at least one of transmission and reception of packets in communication. Instead of exchanging packets, other communication formats, such as line switching, may be used.

The external device 301 also includes, for example, a control circuit 411, a storage circuit 404, a GPS reception unit 405, a display apparatus 407, an operation member 408, an audio input processing circuit 409, and a power supply circuit 410. The control circuit 411 executes, for example, control programs stored in the storage circuit 404, to control the overall operation of the external device 301. The storage circuit 404 stores, for example, control programs to be executed by the control circuit 411, and various information such as parameters for communication. The control circuit 411 executes the control programs stored in the storage circuit 404, to implement various operations to be described below.

The power supply circuit 410 supplies power to the external device 301. The display apparatus 407 includes, for example, a liquid crystal display (LCD) or an LED, which is capable of outputting information that can be visually recognized, and a speaker, which is capable of outputting sound, and displays various information. The operation member 408 is, for example, a button that receives a user operation on the external device 301. The display apparatus 407 and the operation member 408 may be configured using a common member such as a touch panel.

The audio input processing circuit 409 may be configured to, for example, acquire a user's voice input from a general-purpose microphone built in the external device 301, and to acquire a user operation command by voice recognition processing.

Further, an audio command is acquired by user's utterance using a dedicated application in the external device 301. The audio command can also be registered as a specific audio command for causing the audio processing circuit 214 of the image capturing apparatus 101 to recognize the specific audio command by the communication 302 using the wireless LAN.

The GPS reception unit 405 receives a GPS signal sent from a satellite, analyzes the GPS signal, and estimates the current position (longitude/latitude information) of the external device 301. Alternatively, the current position of the external device 301 may be estimated based on information about wireless networks in the surrounding area of the external device 301 by using a Wi-Fi Positioning System (WPS) or the like. If the acquired current GPS position information indicates a position within a preset position range (within a predetermined radius), movement information is sent to the image capturing apparatus 101 using the Bluetooth® Low Energy control circuit 402, and the movement information is used as a parameter for automatic image capturing and automatic editing to be described below. If the GPS position information indicates that the GPS position is changed by a predetermined amount or more, the movement information is sent to the image capturing apparatus 101 using the Bluetooth® Low Energy control circuit 402, and the movement information is used as a parameter for automatic image capturing and automatic editing to be described below.

As described above, the image capturing apparatus 101 and the external device 301 exchange data by communication using the wireless LAN control circuit 401 and the Bluetooth® Low Energy control circuit 402. For example, data such as an audio signal, an image signal, a compressed audio signal, or a compressed image signal is transmitted and received. Further, the external device 301 sends an operation instruction indicating an operation, such as image capturing by the image capturing apparatus 101, transmits audio command registration data, and sends a predetermined position detection notification and a location movement notification based on GPS position information. Furthermore, data for learning is transmitted and received via a dedicated application in the external device 301.

<Configuration of Accessories>

Figure 5:
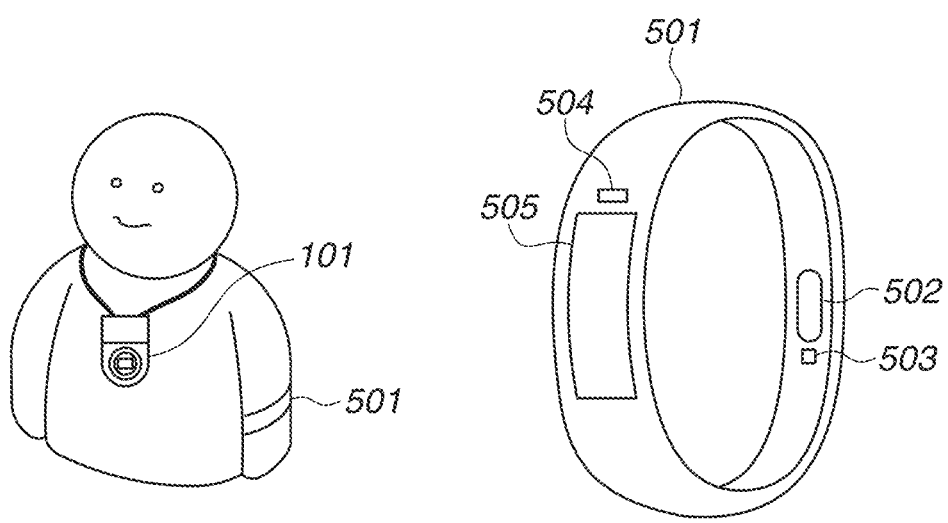
FIG. 5 is a diagram illustrating a configuration example of the external device that can communicate with the image capturing apparatus.

FIG. 5 is a diagram illustrating a configuration example of an external device (wearable device) 501 that can communicate with the image capturing apparatus 101. The image capturing apparatus 101 is a digital camera including an image capturing function, and the external device 501 is a wearable device including various sensing portions capable of communicating with the image capturing apparatus 101 by a Bluetooth® communication module or the like.

The external device 501 is configured to be wearable on the arm or the like of the user, and incorporates a sensor for detecting biological information, such as the pulse, heat rate, or bloodstream of the user, at a predetermined period, an acceleration sensor capable of detecting a motion state of the user, or the like.

A biological information detection circuit 502 includes, for example, a pulse sensor for detecting the pulse of the user, a heat rate sensor for detecting the heat rate of the user, a bloodstream sensor for detecting the bloodstream of the user, or a sensor for detecting a change in potential on the skin of the user being in contact with the sensor using a conductive polymer. The present exemplary embodiment illustrates an example in which a heart rate sensor is used as the biological information detection circuit 502. The heart rate sensor irradiates the skin of the user with infrared light by using an LED or the like, detects the infrared light transmitted through the tissue of the user by using a light reception sensor, and performs signal processing, to detect the heart rate of the user. The biological information detection circuit 502 outputs the detected biological information as a signal to a control circuit 607 to be described below.

A shake detection circuit 503 that detects the motion state of the user has, for example, an acceleration sensor or a gyroscope sensor. Based on acceleration information, the shake detection circuit 503 can detect whether the user is moving and can also detect a motion such as an action by swinging his/her arms.

The external device 501 also has an operation member 505 that receives a user operation via the wearable device 501, and a display apparatus 504, such as an LCD or an LED, which outputs information that can be visually recognized.

Figure 6:
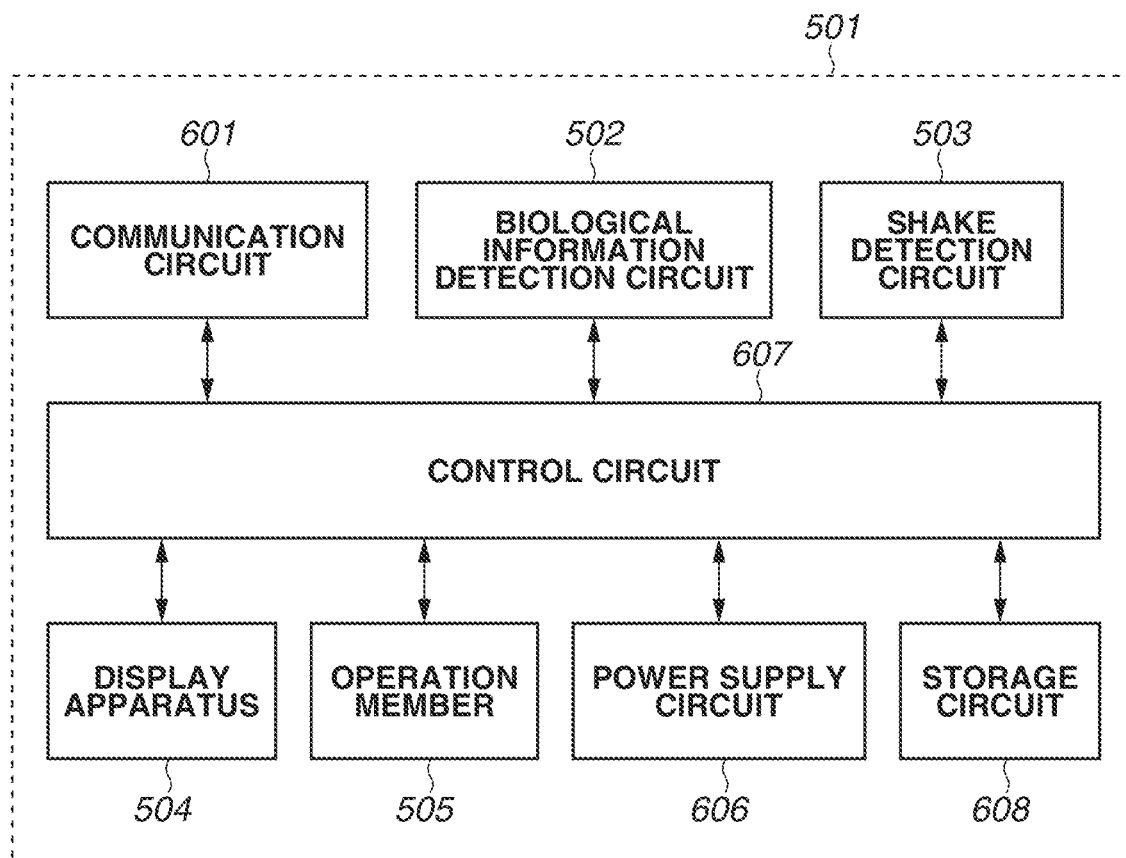
FIG. 6 is a block diagram illustrating a configuration example of the external device.

The configuration of the wearable device 501 will be described with reference to FIG. 6.

The wearable device 501 includes, for example, the control circuit 607, a communication circuit 601, the biological information detection circuit 502, the shake detection circuit 503, the display apparatus 504, the operation member 505, a power supply circuit 606, and a storage circuit 608.

The control circuit 607 executes, for example, control programs stored in the storage circuit 608, to control the overall operation of the wearable device 501. The storage circuit 608 stores, for example, control programs to be executed by the control circuit 607, and various information such as parameters to be used for communication. The control circuit 607 executes, for example, the control programs stored in the storage circuit 608, to implement various operations to be described below.

The power supply circuit 606 supplies the wearable device 501 with power. The display apparatus 504 includes, for example, an LCD or an LED, which is capable of outputting information that can be visually recognized, and a speaker, which is capable of outputting sound, and displays various information. The operation member 505 is, for example, a button that receives a user operation via the wearable device 501. The display apparatus 504 and the operation member 505 may be configured using a common member such as a touch panel.

The operation member 505 may be configured to acquire a user's voice from, for example, a general-purpose microphone built in the wearable device 501, acquire a user's voice by audio processing, and acquire a user operation command by voice recognition processing.

Various detected information that is detected using the biological information detection circuit 502 and the shake detection circuit 503 and is processed by the control circuit 607 is transmitted to the image capturing apparatus 101 from the communication circuit 601.

For example, the detected information is transmitted to the image capturing apparatus 101 at a timing when a change in the heart rate of the user is detected, or the detected information is transmitted at a timing when a change in the movement state, such as walking movement/traveling movement/stop, is transmitted. Further, for example, the detected information is transmitted at a timing when a preset arm-waving motion is detected, or the detected information is transmitted at a timing when a movement for a preset distance is detected.

<Image Capturing Operation Sequence>

Figure 7:
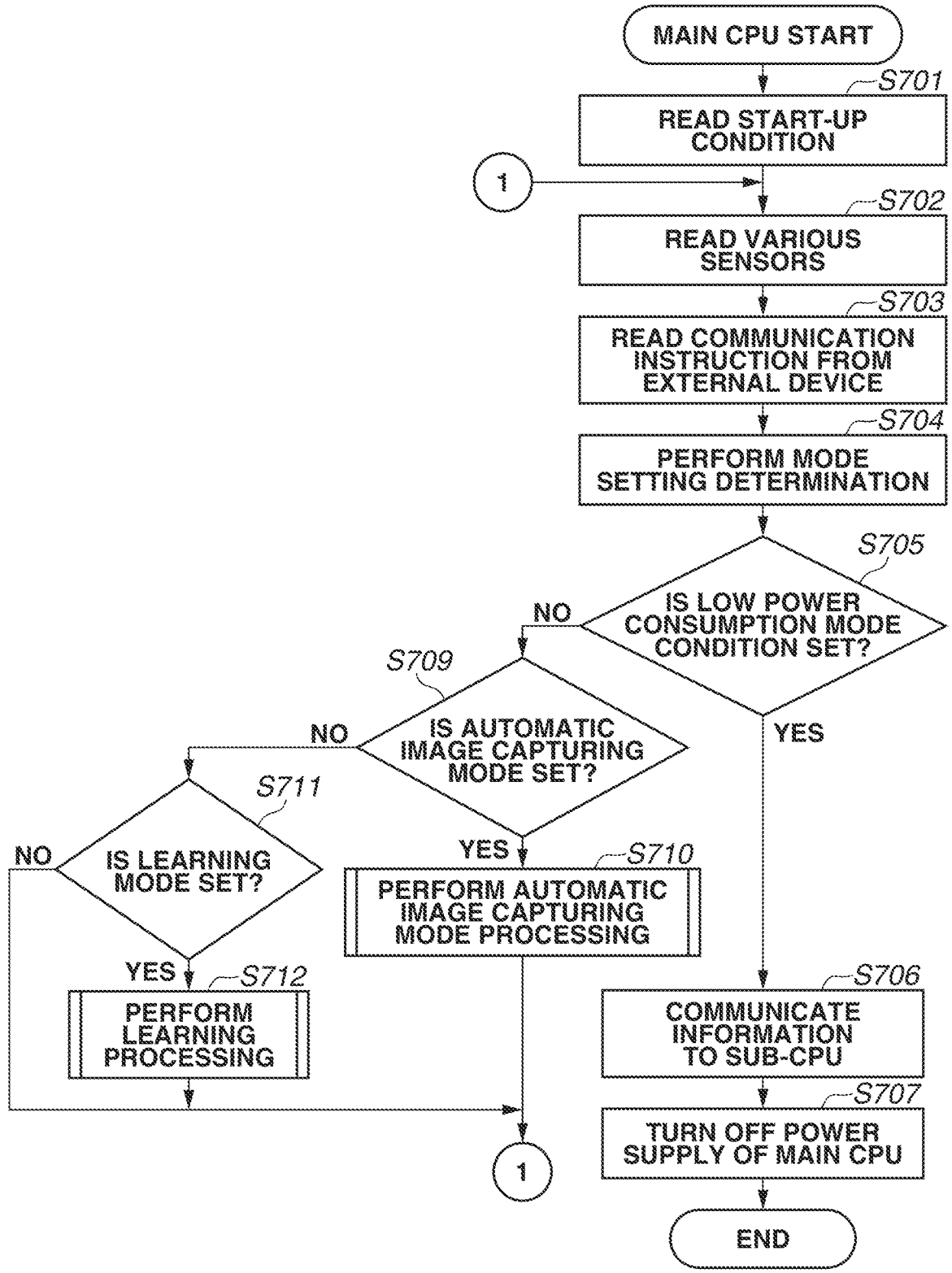
FIG. 7 is a flowchart illustrating an example of an operation to be performed by a first control circuit.

FIG. 7 is a flowchart illustrating an example of an operation to be performed by the first control circuit 223 in the image capturing apparatus 101 according to the present exemplary embodiment.

When the user operates the power supply button on the image capturing apparatus 101, the first power supply circuit 210 causes the power supply unit to supply power to the first control circuit 223 and each block of the image capturing apparatus 101.

Similarly, the second power supply circuit 212 causes the power supply unit to supply power to the second control circuit 211. The operation of the second control circuit 211 will be described in detail below with reference to a flowchart illustrated in FIG. 8.

When power is supplied, processing illustrated in FIG. 7 is started. In step S701 ("step" is hereinafter abbreviated as "S"), a start-up condition is read. Examples of the start-up condition according to the present exemplary embodiment are described below:

(1) The power supply is started when the power supply button is manually pressed;
(2) The power supply is started in response to an instruction from the external device (e.g., the external device 301) using external communication (e.g., Bluetooth® Low Energy communication); and
(3) The power supply is started by a sub-processor (second control circuit 211).

In the case of the start-up condition (3) in which the power supply is started by the sub-processor, the start-up condition calculated in the sub-processor is read. This operation will be described in detail below with reference to FIG. 8.

The start-up condition read in this case is used as a single parameter element during object search or automatic image capturing. This operation will be described below. After completion of reading the start-up condition, the processing proceeds to step S702.

In step S702, the image capturing apparatus 101 reads various sensors. Examples of the sensors to be read in this process include, for example, a gyroscope sensor and an acceleration sensor via the apparatus shake detection circuit 209 detecting a vibration. The image capturing apparatus 101 may also acquire rotation positions of the tilt rotation portion 104 and the pan rotation unit 105. An audio level, a detection trigger for specific voice recognition, or a sound direction detected by the audio processing circuit 214 may also be acquired.

Although not illustrated in FIGS. 1A and 1B to FIG. 6, information is also acquired using a sensor for detecting environment information.

Examples of the sensor include a temperature sensor for detecting the surrounding temperature of the image capturing apparatus 101 at a predetermined period, and an atmospheric pressure sensor for detecting a change in the surrounding atmospheric pressure of the image capturing apparatus 101. In addition, an illuminance sensor for detecting the brightness in the surroundings of the image capturing apparatus 101, a humidity sensor for detecting the humidity in the surroundings of the image capturing apparatus 101, and an ultraviolet (UV) sensor for detecting the amount of ultraviolet light in the surroundings of the image capturing apparatus 101 may be provided. In addition to the detected temperature information, atmospheric pressure information, brightness information, humidity information, and UV information, the amount of change in temperature, the amount of change in atmospheric pressure, the amount of change in humidity, the amount of change in UV, and the like for which a change rate at a predetermined time interval is calculated from various detected information are used for determination in automatic image capturing and the like to be described below.

After the various sensors are read in step S702, the processing proceeds to step S703.

In step S703, it is detected whether a communication instruction is sent from the external device. When the communication instruction is sent from the external device, the communication with the external device is established.

For example, a remote operation through the wireless LAN or Bluetooth® Low Energy is performed by the external device 301, or data such as an audio signal, an image signal, a compressed audio signal, or a compressed image signal is transmitted or received. Further, it is detected whether there is any instruction to be read from the external device 301, such as an operation instruction indicating an operation, such as image capturing by the image capturing apparatus 101, transmission of audio command registration data, and transmission and reception of the predetermined position detection notification, the location movement notification based on GPS position information, or data for learning.

For example, when biological information, such as information about the motion of the user, the action using the arms of the user, or the heart rate of the user, is updated from the wearable device 501, the information is read using Bluetooth® Low Energy. While various sensors for detecting the environment information described above may be mounted on the image capturing apparatus 101, the various sensors may also be mounted on the external device 301 or the wearable device 501. In this case, environment information is also read using Bluetooth® Low Energy. After the information is read through communication from the external device 301 in step S703, the processing proceeds to step S704.

In step S704, a mode setting determination is performed. A mode to be set in step S704 is determined and selected from among the following options.

(1) Automatic Image Capturing Mode

[Mode Determination Condition]

An automatic image capturing mode is set when it is determined that automatic image capturing is to be performed, based on each preset detected information (image, sound, time, vibration, location, change in body, or change in environment), an elapsed time from a time when the mode transitions to the automatic image capturing mode, previous image capturing information, or the like.

[Intra-Mode Processing]

In automatic image capturing mode processing (step S710), pan/tilt driving and zoom driving are performed and objects are automatically searched based on each detected information (image, sound, time, vibration, location, change in body, or change in environment). Then, when it is determined that a timing for image capturing that matches the user's preference can be performed is reached, image capturing is automatically performed.

(2) Learning Mode

[Mode Determination Condition]

An automatic learning mode is set when it is determined that automatic learning is to be performed, based on an elapsed time from a time when the previous learning processing is performed, information associated with images that can be used for learning, the number of pieces of learning data, or the like. The automatic learning mode is also set when an instruction to set learning data is sent from the external device 301 through communication.

[Intra-Mode Processing]

In automatic learning mode processing (step S712), learning for automatic image capturing in accordance with the user's preference is performed. Learning processing in accordance with the user's preference is performed using a neural network based on information about each operation on the external device 301 and information about a learning information notification from the external device 301. Examples of the information about each operation on the external device 301 include image acquisition information from the image capturing apparatus 101, information indicating that an editing instruction is manually made through a dedicated application, and determination value information input by the user for images in the image capturing apparatus 101.

The automatic image capturing mode processing and learning mode processing will be described in detail below.

In step S704, whether the mode setting determination is set to a low power consumption mode is determined. When a predetermined condition, such as a condition in which a state where a user operation is not performed continues for a predetermined period, is satisfied in a state where the automatic image capturing mode is not set, it is determined that the low power consumption mode is set. After completion of the determination processing, the processing proceeds to step S705.

In step S705, in a case where a result of the determination indicates that the low power consumption mode condition is set (YES in step S705), the processing proceeds to step S706.

In step S706, various parameters (a shake detection determination parameter, an audio detection parameter, and a lapse-of-time detection parameter) associated with start-up factors to be determined in the sub-processor are sent to the sub-processor (second control circuit 211). After completion of the processing of step S706, the processing proceeds to step S707. The power supply of a main processor (first control circuit 223) is turned OFF and the image capturing apparatus 101 terminates the processing.

Meanwhile, in a case where a result of the determination indicates that the low power consumption mode is not set in step S705 (NO in step S705), the processing proceeds to step S709. In step S709, it is determined whether the automatic image capturing mode is set. In a case where the automatic image capturing mode is set (YES in step S709), the processing proceeds to step S710. In step S710, automatic image capturing mode processing is performed. After completion of the processing, the processing returns to step S702 to repeat the processing. In step S709, in a case where it is determined that the automatic image capturing mode is not set (NO in step S709), the processing proceeds to step S711.

In step S711, it is determined whether the learning mode is set. In a case where it is determined that the learning mode is set (YES in step S711), the processing proceeds to step S712. In step S712, learning mode processing is performed. After completion of the processing, the processing returns to step S702 to repeat the processing. In step S711, in a case where it is determined that the learning mode is not set (NO in step S711), the processing returns to step S702 to repeat the processing.

Figure 8:
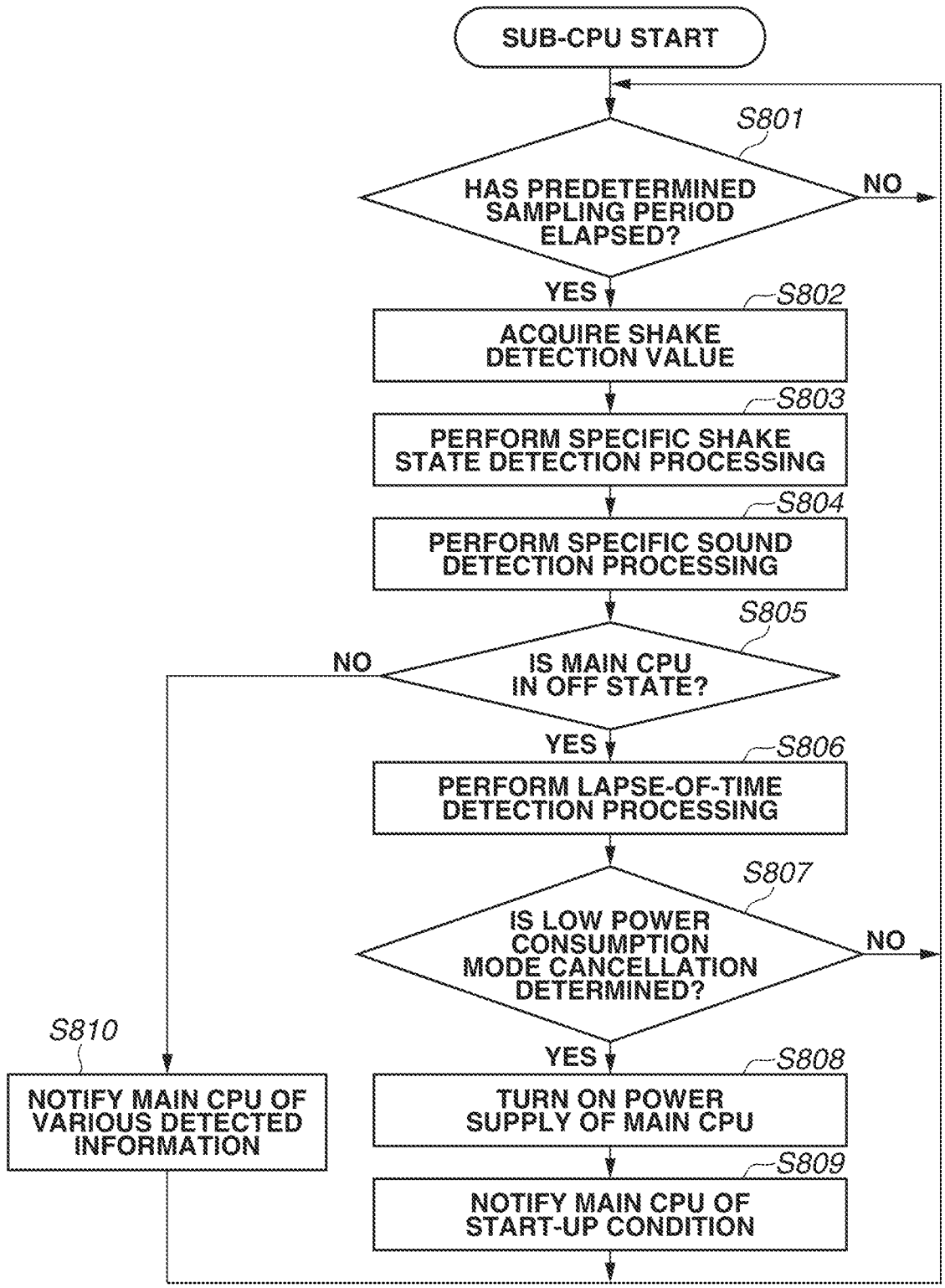
FIG. 8 is a flowchart illustrating an example of an operation to be performed by a second control circuit.

FIG. 8 is a flowchart illustrating an example of an operation to be performed by the second control circuit 211 of the image capturing apparatus 101 according to the present exemplary embodiment.

When the power supply button on the image capturing apparatus 110 is operated by the user, the second power supply circuit 212 causes the power supply unit to supply power to the second control circuit 211 in the same manner as the first power supply circuit 210 causes the power supply unit to supply power to the first control circuit 223. When power is supplied, the sub-processor (second control circuit 211) is started to start the processing illustrated in FIG. 8.

In step S801, it is determined whether a predetermined sampling period has elapsed. For example, in a case where 10 msec is set as the predetermined period, the processing proceeds to step S802 every 10 msec. In a case where it is determined that the predetermined period has not elapsed (NO in step S801), the processing returns to step S801 without performing any processing, and the sub-processor waits for the lapse of the predetermined period.

In step S802, a shake detection value is acquired. The shake detection value is an output value from the apparatus shake detection circuit 209 using a sensor for detecting a vibration, such as a gyroscope sensor or an acceleration sensor.

When the shake detection value is acquired in step S802, the processing proceeds to step S803 to perform preset shake state detection processing.

When specific shake state detection processing is performed in step S803, the processing proceeds to step S804 to perform preset specific sound detection processing.

In the audio processing circuit 214, the above-described determination processing is performed. In step S804, it is determined whether specific sound is detected.

When the specific sound detection processing is performed in step S804, the processing proceeds to step S805. In step S805, it is determined whether the main processor (first control circuit 223) is in an OFF state. In a case where the main processor is in the OFF state (YES in step S805), the processing proceeds to step S806. In step S806, preset lapse-of-time detection processing is performed. An elapsed time from a time when the main processor transitions from an ON state to the OFF state is measured. If the elapsed time is longer than or equal to a parameter time C, it is determined that the time has elapsed. If the elapsed time is shorter than the parameter time C, it is not determined that the time has elapsed.

When the lapse-of-time detection processing is performed in step S806, the processing proceeds to step S807 to determine whether a low power consumption mode cancellation determination is performed. The low power consumption mode cancellation determination is performed based on the following conditions:
(1) A determination condition for specific shake detection;
(2) A determination condition for specific sound detection; and
(3) A determination condition for lapse-of-time determination.

Whether the determination condition for specific shake detection is satisfied can be determined by the specific shake state detection processing in step S803. Whether the determination condition for specific sound detection is satisfied can be determined by the specific sound detection processing in step S804. Whether the determination condition for lapse-of-time detection is satisfied can be determined by the lapse-of-time detection processing in step S806. Accordingly, if any one of the above-described conditions is satisfied, it is determined that the low power consumption mode cancellation is to be performed.

In a case where the low power consumption mode cancellation is determined in step S807, the processing proceeds to step S808 to turn ON the power supply of the main processor. In step S809, a notification indicating the condition (shake, sound, or time) based on which the low power consumption mode cancellation is determined is sent to the main processor, and the processing returns to step S801 to loop the processing.

If none of the cancellation conditions is satisfied in step S807 and in a case where the low power consumption mode cancellation is not determined (NO in step S807), the processing returns to step S801 to loop the processing.

In step S805, in a case where it is determined that the main processor is in the ON state, the information acquired in steps 5802 to 5805 is sent to the main processor, and the processing returns to step S801 to loop the processing.

The present exemplary embodiment illustrates a configuration in which the sub-processor performs shake detection and specific sound detection also when the main processor is in the ON state, and the detection results are sent to the main processor. However, when the main processor is in the ON state, shake detection and specific sound detection may be performed in the processing (step S702 illustrated in FIG. 7) in the main processor, without performing the processing of steps S802 to S805.

While the low power consumption mode cancellation method based on shake detection, sound detection, and an elapsed time has been described in detail above, the low power consumption mode cancellation based on environment information may be performed. The environment information can be determined based on whether the absolute amount or change amount of the temperature, atmospheric pressure, brightness, humidity, or UV exceeds a predetermined threshold.

<Automatic Image Capturing Mode Processing>

The automatic image capturing mode processing will be described in detail with reference to FIG. 9. As described above, the following processing is controlled by the first control circuit 223 of the image capturing apparatus 101 according to the present exemplary embodiment.

In step S901, image processing is performed on a signal sent to the image processing circuit 207 from the image capturing unit 206, to generate an image for object recognition.

Based on the generated image, object recognition for recognizing a person, an object, and the like is performed.

In the case of recognizing a person, the face or body of an object is detected. In face detection processing, a pattern for determining the face of a person is determined in advance, and an area that matches the pattern included in a captured image can be detected as a face image of the person.

The reliability indicating the degree of certainty for the face of the object is calculated at the same time. The reliability is calculated based on, for example, the size of the face area in the image, the coincidence with the face pattern, or the like.

Similarly, in object recognition, an object that matches a preliminarily registered pattern can be recognized.

In addition, for example, a method for extracting a characteristic object by using a histogram of hue, color saturation, or the like in a captured image can be used. In this case, processing for dividing a distribution, which is associated with an image of an object captured within an image capturing field angle and is derived from the histogram of hue, color saturation, or the like, into a plurality of sections and classifying the captured image for each section is executed.

For example, a histogram of a plurality of color components of a captured image is created, and the color components are classified in a mound-shaped distribution range.

Further, images captured in an area belonging to a combination in the same section are classified and the image area of each object is recognized.

An evaluation value is calculated for each recognized object image area, whereby the image area of an object with a highest evaluation value can be determined as a main object area.

By the method described above, each object information can be obtained from image capturing information.

In step S902, an image blur correction amount is calculated. Specifically, first, the absolute angle of the image capturing apparatus 101 is calculated based on the angular velocity and the acceleration information acquired by the apparatus shake detection circuit 209. Further, an image stabilization angle for moving the tilt rotation portion 104 and the pan rotation unit 105 in an angle direction in which the absolute angle is cancelled is obtained and used as an image blur correction amount.

In step S903, the state of the image capturing apparatus 101 is determined. The current vibration/motion state of the image capturing apparatus 101 is determined based on the angle, movement amount, and the like detected using angular velocity information, acceleration information, GPS position information, and the like.

For example, when image capturing is performed in a state where the image capturing apparatus 101 is mounted on a vehicle, object information, such as a surrounding landscape, greatly changes depending on a traveling distance of the vehicle.

Therefore, whether the image capturing apparatus 101 is mounted on a vehicle or the like and the vehicle travels at a high speed, i.e., whether the image capturing apparatus 101 is in a "vehicle traveling state," is determined, and the determination can be used for automatic object search to be described below.

Further, whether an angular change is large and whether the image capturing apparatus 101 is in a "place-and-shoot state" in which the image capturing apparatus 101 has almost no shake angle are determined.

When the image capturing apparatus 101 is in the "place-and-shoot state", it can be considered that the angle of the image capturing apparatus 101 itself is not changed, and thus object search for place-and-shoot state can be performed.

When an angular change is relatively large, it is determined that the image capturing apparatus 101 is in a "hand-held state", and thus object search for hand-held state can be performed.

In step S904, object search processing is performed. The object search includes, for example, the following processing.

(1) Area Division

Figure 11A:
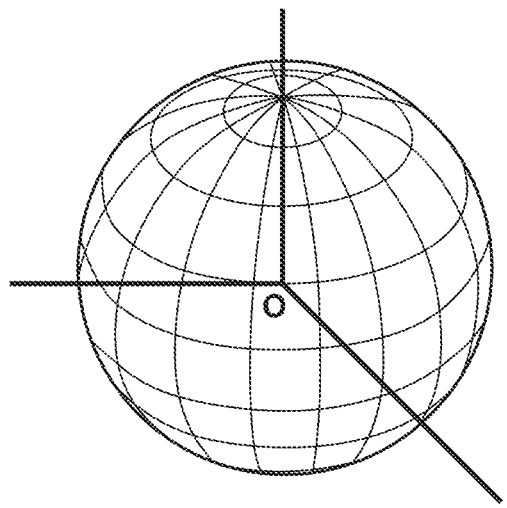
FIGS. 11A, 11B, and 11C are diagrams each illustrating area division within a captured image.
Figure 11B:
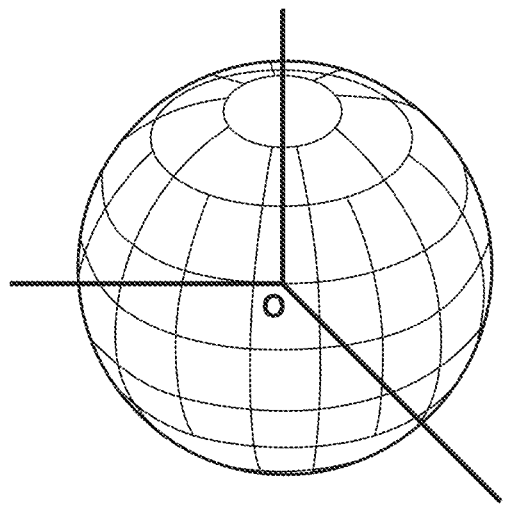
Figure 11C:
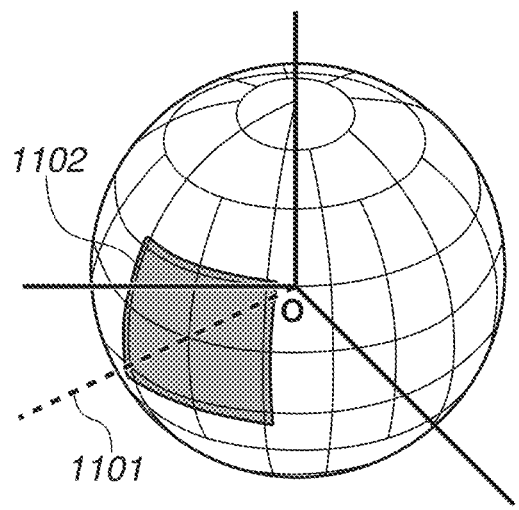
Figure 11D:
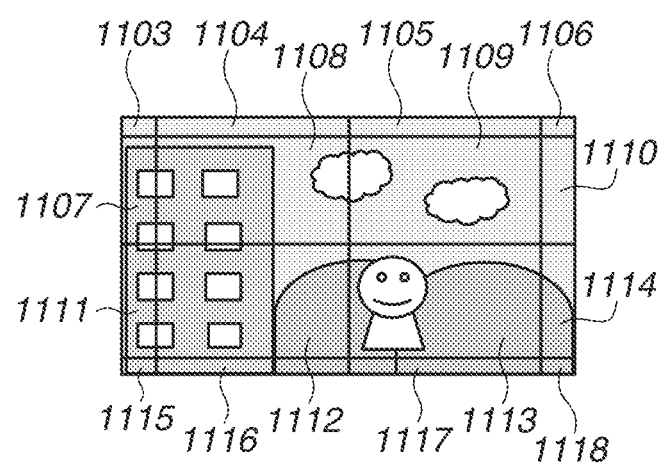
FIG. 11D is a diagram illustrating an example image.

Area division will be described with reference to FIGS. 11A to 11D. As illustrated in FIG. 11A, area division is performed on the entire circumference about the position of the image capturing apparatus 101 (origin O is set as the position of the image capturing apparatus 101). In an example illustrated in FIG. 11A, the area is divided at an angle of 22.5 degrees in each of the tilt direction and the pan direction. When the area is divided as illustrated in FIG. 11A, the circumference in a horizontal direction decreases and the area decreases in a direction in which the angle in the tilt direction is away from 0 degrees. Accordingly, as illustrated in FIG. 11B, when the tilt angle is greater than or equal to 45 degrees, the area range in the horizontal direction is set to be greater than 22.5 degrees. FIGS. 11C and 11D each illustrate an example in which the area is divided within an image capturing field angle. An axis 1101 represents the direction of the image capturing apparatus 101 at the time of initialization, and area division is performed based on the direction angle as a reference position. An axis 1102 represents the area of the field angle of a captured image. FIG. 11D illustrates an example of the image obtained in this case. In the image captured within the field angle, the image is divided into areas 1103 to 1118 illustrated in FIG. 11D based on the area division.

(2) Calculation of Importance Level for Each Area

For each area obtained through the division as described above, an importance level indicating a priority level for search is calculated based on each object present in the area and a scene situation in the area. The importance level based on the status of each object is calculated based on, for example, the number of persons present in the area, the size of the face of each person, a face direction, a degree of certainty for face detection, the expression of each person, and a result of personal authentication on each person. Examples of the importance level based on the status of each scene include a general object recognition result, a scene discrimination result (blue sky, backlight, evening view, etc.), a result of recognizing a voice or a sound level in the direction of the area, and motion detection information in the area. In the image capturing apparatus state determination (step S903), the vibration state of the image capturing apparatus 101 is detected, and thus the importance level can be changed depending on the vibration state. For example, if it is determined that the image capturing apparatus 101 is in the "place-and-shoot state", the determination is performed in such a manner that a high importance level is set when facial recognition of a specific person is detected so that object search can be performed based on an object (e.g., the user of the image capturing apparatus 101) with a high priority level among the objects registered for facial recognition. Also, in automatic image capturing to be described below, the image capturing is performed by placing a higher priority on the face described above. Even in a case where the user carries the image capturing apparatus 101 in a state where the image capturing apparatus 101 is worn on the body of the user of the image capturing apparatus 101 and the user performs image capturing for a long period of time, a large number of images of the user can be captured and stored when the image capturing apparatus 101 is detached and placed on a desk or the like. In this case, search can be performed by panning or tilting. Accordingly, a large number of images of the user, or group photos and the like in which many faces are included can be stored by appropriately installing the image capturing apparatus 101, without considering the angle at which the image capturing apparatus 101 is placed. Under the above-described conditions, the same area with the highest importance level is selected, so that the area to be searched is not changed unless there is a change in each area. Therefore, the importance level is changed depending on the previous image capturing information. Specifically, the importance level may be decreased in the area that is continuously designated as a search area for a predetermined period, or the importance level may be decreased for a predetermined period in the area on which image capturing is performed in step S910 to be described below.

(3) Determination of Area to be Searched

After the importance level for each area is calculated as described above, an area with a high importance level is determined as an area to be searched. Then, a pan/tilt search target angle required for setting the area to be searched within the field angle is calculated.

In step S905, pan/tilt driving is performed. Specifically, the amount of pan/tilt driving is calculated by adding a driving angle in control sampling based on the image blur correction amount and the pan/tilt search target angle. The barrel rotation driving circuit 205 drives and controls each of the tilt rotation portion 104 and the pan rotation unit 105.

In step S906, the zoom unit 201 is controlled to perform zoom driving. Specifically, zoom driving is performed depending on the state of the search target object determined in step S904. For example, in a case where the search target object is the face of a person, if the face on the image is extremely small, the size of the face may be smaller than a minimum detectable size and the face cannot be detected, and therefore the image capturing apparatus 101 may lose track of the person. In such a case, a control operation is performed in such a manner that the size of the face on the image is increased by zooming the image in a telephoto direction. Meanwhile, if the size of the face on the image is extremely large, the object is more likely to move out of the range of the field angle due to the motion of the object or the image capturing apparatus 101 itself. In this case, a control operation is performed in such a manner that the size of the face on a screen is decreased by zooming the image in a wide-angle direction. With this zoom control, a state suitable for tracking an object can be maintained.

In steps S904 to S906, the method for performing object search by pan/tilt driving or zoom driving has been described. Alternatively, the object search may be performed in an image capturing system for capturing an image in all directions at once by using a plurality of wide-angle lenses. In the case of using a 360-degree camera, if image processing, such as object detection, is performed using all signals obtained by image capturing as an input image, a huge amount of processing is required. Accordingly, a part of the image is cut out and object search processing is performed in the range of the cut-out image. Like in the method described above, the importance level for each area is calculated, the position where the image is cut out is changed based on the importance level, and the determination of whether to perform automatic image capturing to be described below is performed. With this configuration, power consumption due to image processing can be reduced and high-speed object search can be performed.

In step S907, it is determined whether a (manual) image capturing instruction is made by the user. In a case where the image capturing instruction is made (YES in step S907), the processing proceeds step S910. Examples of the (manual) image capturing instruction made by the user in this process may include pressing a shutter button, tapping the housing of the image capturing apparatus 101 with a finger or the like, an audio command input, and an instruction from an external device. The image capturing instruction by a tap operation is an image capturing instruction method in which a continuous high-frequency acceleration is detected during a short period by the apparatus shake detection circuit 209 in a case where the user taps the housing of the image capturing apparatus 101, and the detected acceleration is used as a trigger for image capturing. The audio command input is an image capturing instruction method in which audio is recognized by the audio processing circuit 214 in a case where the user speaks a password (e.g., "take a photo") for instructing predetermined image capturing, and the recognized audio is used as a trigger for image capturing. The instruction from the external device is an image capturing instruction method in which a shutter instruction signal transmitted through a dedicated application from a smartphone or the like connected to the image capturing apparatus 101 using Bluetooth® is used as a trigger for image capturing.

In step S907, in a case where the image capturing instruction is not made (NO in step S907), the processing proceeds to step S908. In step S908, an automatic image capturing determination is performed. In the automatic image capturing determination, whether to perform automatic image capturing is determined.

(1) Determination of Whether to Perform Automatic Image Capturing

Figure 10:
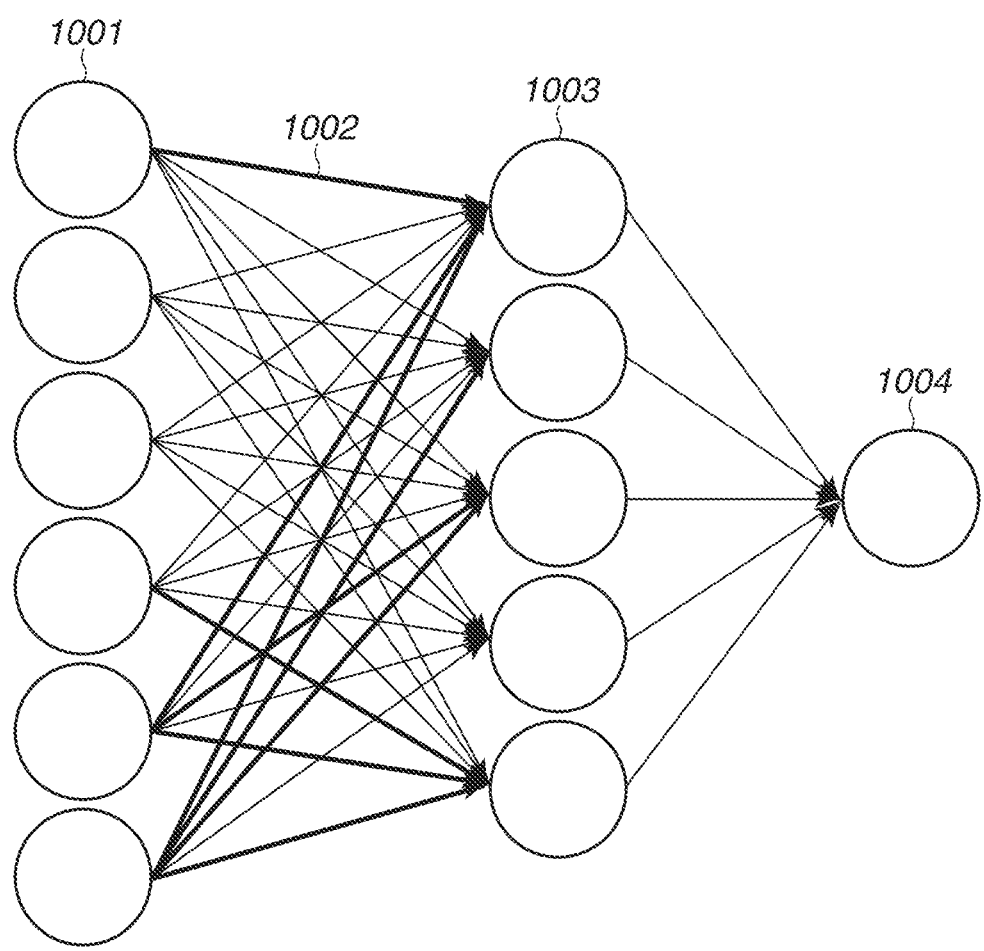
FIG. 10 is a diagram illustrating a neural network.

Whether to perform automatic image capturing is a determination based on a neural network which is one of machine learning techniques. FIG. 10 illustrates an example of a network using a multilayer perceptron as an example of the neural network. The neural network is used to predict an output value based on an input value. The output value that matches a learned model can be estimated for a new input value by preliminarily learning the input value and the output value used as a model for the input value. The learning method will be described below. A circle 1001 illustrated in FIG. 10 and circles vertically arranged below the circle 1001 represent neurons in an input layer. A circle 1003 illustrated in FIG. 10 and circles vertically arranged below the circle 1003 represent neurons in an intermediate layer. A circle 1004 illustrated in FIG. 10 illustrates a neuron in an output layer. Each arrow 1002 indicates a connection between neurons. In the determination based on the neural network, a feature amount based on objects captured in the current field angle, scenes, and the state of the image capturing apparatus 101 is supplied to the neurons in the input layer as an input, and a value output from the output layer is obtained through a calculation based on a forward propagation in a multilayer perceptron. If the output value is greater than or equal to a threshold, it is determined to carry out automatic image capturing. As object features, a current zoom ratio, a general object recognition result at the current field angle, a face detection result, the number of faces captured at the current field angle, the degree of smile on each face, the degree of eye closure, a face angle, a facial recognition identification (ID) number, a viewpoint angle of an object person, a scene discrimination result, a detection result of a specific composition, and the like are used. Further, an elapsed time from the previous image capturing time, a current time, the amount of position change based on GPS position information and the previous image capturing position, a current audio level, a person emitting a voice, a burst of cheers, and a burst of applause may be used. Furthermore, vibration information (acceleration information and the state of the image capturing apparatus 101), environment information (temperature, atmospheric pressure, illuminance, humidity, and the amount of ultraviolet light), and the like may be used. Further, when a notification indicating information is sent from the wearable device 501, notification information (e.g., user's motion information, arm action information, or biological information such as a heart rate) may also be used as a feature. This feature is converted into a numerical value in a predetermined range, and the numerical value is given to each neuron in the input layer as a feature amount. Accordingly, a number of neurons in the input layer corresponds to the number of feature amounts to be used as described above.

In the determination based on the neural network, a connection weight between neurons is changed by learning processing as described below and the output value is changed, and therefore the determination result can be adapted to the learning result.

The determination to perform automatic image capturing is also changed depending on the main processor start-up condition read in step S702 illustrated in FIG. 7. For example, upon start-up by detection of a tap operation, or upon start-up in response to a specific audio command, it is highly likely that the operation is currently desired by the user to perform image capturing. Accordingly, the frequency of image capturing is increased.

In step S909, in a case where it is determined to perform image capturing as a result of the automatic image capturing determination in step S908 (YES in step S909), the processing proceeds to step S910. In a case where it is not determined to perform image capturing (NO in step S909), the image capturing mode processing ends.

In step S910, image capturing is started. In this process, the focus driving control circuit 204 controls autofocus. Further, exposure control for setting an appropriate brightness for an object is performed using an aperture control circuit (not illustrated), a sensor gain control circuit (not illustrated), and a shutter control circuit (not illustrated). After image capturing, the image processing circuit 207 performs various types of image processing such as automatic white balance processing, noise reduction processing, and gamma correction processing, to generate an image.

During image capturing as described above, when a predetermined condition is satisfied, the image capturing apparatus 101 may perform image capturing after processing in which the image capturing apparatus 101 informs a person whose image is to be captured that image capturing is to be performed. As an informing method, for example, a voice message or sound from the audio output circuit 218, or LED lighting by the LED control circuit 224 may be used, or a motion operation for visually guiding the line of sight of an object by performing pan/tilt driving may also be used. Examples of the predetermined condition include the number of faces within a field angle, the degree of smile on each face, the degree of eye closure, a viewpoint angle of an object person, a face angle of an object person, a facial recognition ID number, and the number of persons registered in personal authentication. Examples of the predetermined condition also include a general object recognition result during image capturing, a scene discrimination result, an elapsed time from the previous image capturing, an image capturing time, information indicating whether the current position based on GPS information is a scenic spot, an audio level during image capturing, the presence or absence of a person emitting a voice, a burst of applause, and a burst of cheers. Examples of the predetermined condition also include vibration information (acceleration information and the state of the image capturing apparatus 101) and environment information (temperature, atmospheric pressure, illuminance, humidity, and the amount of ultraviolet light). Image capturing based on these conditions makes it possible to capture and store images with a preferable camera viewpoint in a scene with a high importance.

In addition, using a plurality of predetermined conditions, a voice message or sound, an LED lighting method (a color, a blinking time, or the like), and a pan/tilt motion method (how to move or a driving speed) can be changed, depending on each condition.

In step S911, the image generated in step S910 is processed by, for example, editing and adding the image to a moving image. Specific examples of the image processing include trimming based on the face of a person or an in-focus position, image rotation, a high dynamic range (HDR) effect, a blurring effect, and a color conversion filter effect. In the image processing, a plurality of images may be generated by a combination of different types of the processing described above using the image generated in step S910, and the generated images may be stored separately from the image generated in step S910 described above. Further, as moving image processing, a captured moving image or a still image may be added to a generated edited moving image while slide, zoom, or fade special effect processing is performed. Also, in the editing processing in step S911, the image processing method can be determined by determination based on a neural network using information about the captured image, or various information detected before image capturing.

In step S912, learning information generation processing is performed on the captured image. In this case, information to be used for learning processing to be described below is generated and recorded.

Figure 12:
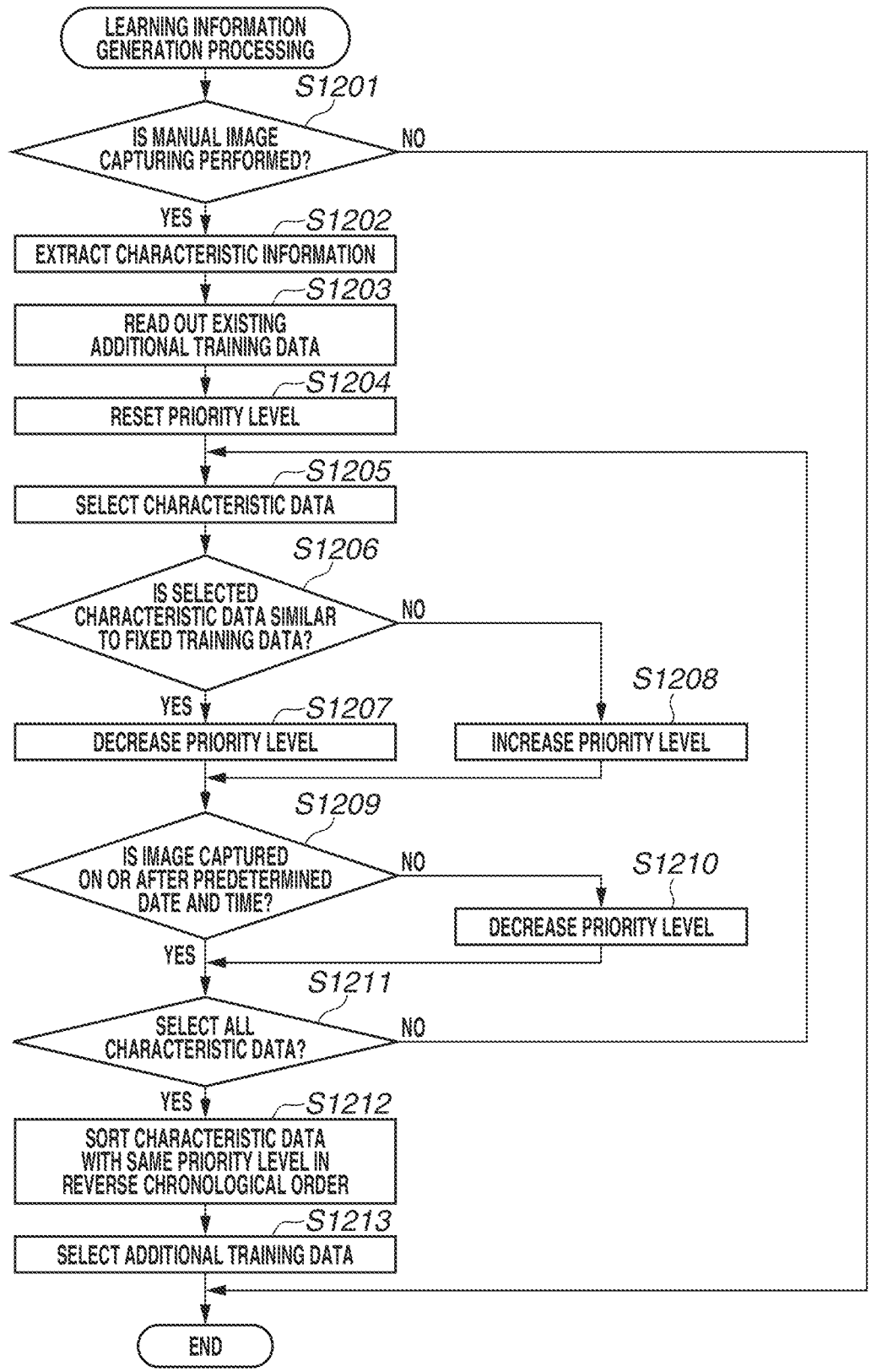
FIG. 12 is a flowchart illustrating a processing procedure in learning information generation processing.

FIG. 12 is a flowchart illustrating learning information generation processing according to the present exemplary embodiment. In step S1201, in a case where the first control circuit 223 performs manual image capturing in step S910 (YES in step S1201), the processing proceeds to step S1202. In a case where automatic image capturing is performed (NO in step S1201), the processing in this flowchart is terminated.

In step S1202, the first control circuit 223 extracts characteristic data on the captured image. Specific examples of the characteristic data include a zoom ratio obtained during image capturing, a general object recognition result obtained during image capturing, a face detection result, the number of faces included in a captured image, the degree of smile on each face, the degree of eye closure, a face angle, a facial recognition ID number, and a viewpoint angle of an object person in the current captured image. Specific examples of the characteristic data also include a scene discrimination result, an elapsed time from the previous image capturing, an image capturing time, the amount of position change based on GPS position information and the previous image capturing position, an audio level obtained during image capturing, a person emitting a voice, a burst of applause, and a burst of cheers. Specific examples of the characteristic data also include vibration information (acceleration information and the state of the image capturing apparatus 101), environment information (temperature, atmospheric pressure, illuminance, humidity, and the amount of ultraviolet light), a moving image capturing time, and information indicating whether a manual image capturing instruction is made. In addition, a score is calculated as an output of a neural network obtained by quantifying the user's preference for images.

Figure 13:
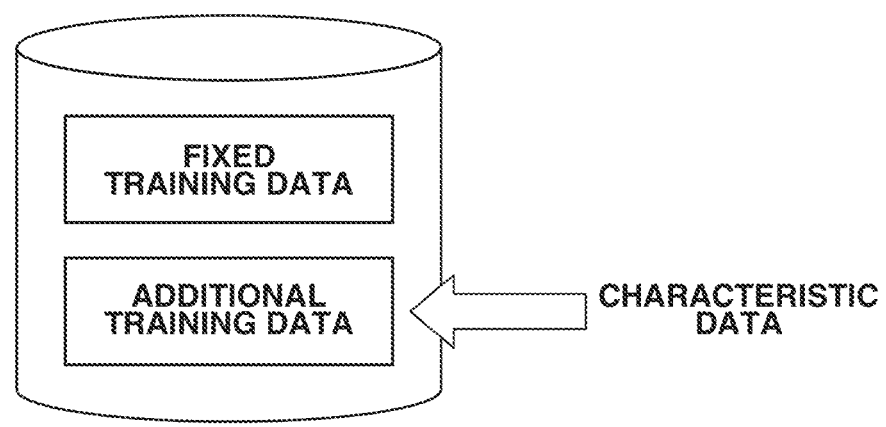
FIG. 13 is a diagram illustrating learning information including fixed training data and additional training data.

In step S1203, the first control circuit 223 reads out the characteristic data extracted in step S1202 as existing additional training data from the nonvolatile memory 216. In the present exemplary embodiment, as illustrated in FIG. 13, learning information including fixed training data and additional training data is held in the nonvolatile memory 216. The fixed training data is a set of characteristic data for learning standard determination criteria. The set of characteristic data is stored before shipment of the image capturing apparatus 101, or is acquired from a server. On the other hand, the additional training data is a set of characteristic data extracted from images manually captured by the image capturing apparatus 101, and is used for reflecting the user's preference in the image capturing apparatus 101.

By Learning using newly obtained characteristic data, the user's most recent preference can be reflected in the image capturing apparatus 101. However, if the learning using the characteristic data extracted from the manually captured images is unlimitedly performed, the ratio of the amount of characteristic data stored before shipping to overall data decreases. Consequently, the learning result may place a disproportionate emphasis on the user's preference. Therefore, in the present exemplary embodiment, the learning information is classified into fixed training data and additional training data. If new characteristic data to be stored as training data is obtained, only the additional training data is updated without updating the fixed training data stored as basic characteristic data.

In step S1204, the first control circuit 223 resets the priority level of the characteristic data extracted in step S1202 and the priority level of the characteristic data included in the existing additional training data read in step S1203. For example, the highest priority level is indicated by "1" and the lowest priority level is indicated by "5". The priority levels of the characteristic data extracted in step S1202 and the characteristic data included in the existing additional training data read in step S1203 are set to "3".

In step S1205, the first control circuit 223 selects one of the pieces of characteristic data whose priority level is reset in step S1204.

In step S1206, the first control circuit 223 compares the selected characteristic data with each piece of characteristic data included in the fixed training data, and determines whether the selected characteristic data is similar to any one of the pieces of the characteristic data. If the similarity between the selected characteristic data and the characteristic data in the fixed training data is greater than or equal to a threshold, the first control circuit 223 determines that the selected characteristic data is similar to the characteristic data included in the fixed training data. In a case where it is determined that the selected characteristic data is similar to the characteristic data included in the fixed training data (YES in step S1206), the processing proceeds to step S1207. In a case where it is determined that the selected characteristic data is not similar to the characteristic data included in the fixed training data (NO in step S1206), the processing proceeds to step S1208.

In step S1207, the first control circuit 223 decreases the priority level of the selected characteristic data. The priority level may be decreased as the degree of similarity increases.

In step S1208, the first control circuit 223 increases the priority level of the selected characteristic data. The priority level may be increased as the degree of similarity decreases.

In step S1209, the first control circuit 223 determines whether the image from which the selected characteristic data is acquired is captured on or after a predetermined date and time. In a case where the image is captured on or after the predetermined date and time (YES in step S1209), the processing proceeds to step S1211. In a case where the image is captured before the predetermined date and time (NO in step S1209), the processing proceeds to step S1210. The predetermined date and time may be set, for example, a half year or one year before a date when the processing of step S1209 is performed. Alternatively, depending on the frequency of manual image capturing, an earlier date and time may be set with decreasing the frequency of image capturing.

In step S1210, the first control circuit 223 decreases the priority level of the characteristic data extracted from images obtained on the capturing date and time that is earlier than the predetermined date and time.

In step S1211, the first control circuit 223 determines whether all the characteristic data extracted in step S1202 and the characteristic data included in the existing additional training data read in step S1203 are selected in step S1205.

In a case where there is any characteristic data that has not been selected (NO in step S1211), the processing returns to step S1205. In a case where all the characteristic data are selected (YES in step S1211), the processing proceeds to step S1212.

In step S1212, the first control circuit 223 sorts the characteristic data in descending order of priority level. In this process, among pieces of characteristic data assigned with the same priority level, the corresponding images are sorted in reverse chronological order based on image capturing date and time.

In step S1213, the first control circuit 223 selects only a predetermined number of pieces of characteristic data in the order of the sorted characteristic data, and updates the learning information as new additional training data.

The processing illustrated in steps S1206 to S1212 is an example of the method for sorting the characteristic data. Alternatively, other sorting methods may also be used. For example, the characteristic data may be simply sorted in reverse chronological order of image capturing date and time of the corresponding image, or may be sorted randomly. In step S1213, the number of pieces of characteristic data to be selected as new additional training data may be fixed or variable. For example, in a configuration in which information indicating whether to actively reflect the user's preference in learning processing can be selected by the user on a menu screen, when the information indicating that the user's preference is to be actively reflected in learning processing is selected, an upper limit of the number of pieces of characteristic data to be selected as new additional training data may be increased.

The learning data updated as described above is written into the nonvolatile memory 216. Alternatively, information about each captured image is stored as so-called catalog data in a list format in the recording medium 221.

Referring again to FIG. 9, the previous image capturing information is updated in step S913. Specifically, the count of images captured in this process is respectively incremented by "1" for each of the number of captured images for each area described above in step S908, the number of captured images of each person registered in personal authentication, the number of captured images for each object recognized in general object recognition, and the number of captured images of each scene in scene discrimination.

<Learning Mode Processing>

Next, learning in accordance with the user's preference according to the present exemplary embodiment will be described.

In the present exemplary embodiment, the learning processing circuit 219 performs learning in accordance with the user's preference by using the neural network as illustrated in FIG. 10 and a machine learning algorithm. The learning processing circuit 219 is, for example, Jetson TX2 manufactured by NVIDIA Corporation. The neural network is used to predict an output value based on an input value. Learning the relationship between the input value and the output value in advance enables estimation of the output value corresponding to a new input value. Learning processing in accordance with the user's preference is performed on the above-described automatic image capturing or object search by using the neural network.

Object registration (facial recognition, general object recognition, or the like) associated with characteristic data to be input to the neural network is also performed.

In the present exemplary embodiment, criteria for automatic image capturing are learned.

Learning for automatic image capturing will be described. In automatic image capturing, learning for automatically performing image capturing in accordance with the user's preference is performed. As described above with reference to the flowchart illustrated in FIG. 9, the learning information generation processing is performed after image capturing (step S912). Images to be learned are selected by a method to be described below, and the images are learned by changing the weight of the neural network based on learning information included in the images.

Next, learning methods will be described.

The learning methods include "learning in an image capturing apparatus" and "learning in cooperation with a communication device".

The method of learning in the image capturing apparatus will be described below.

Learning in the image capturing apparatus according to the present exemplary embodiment includes the following method.

Figure 9:
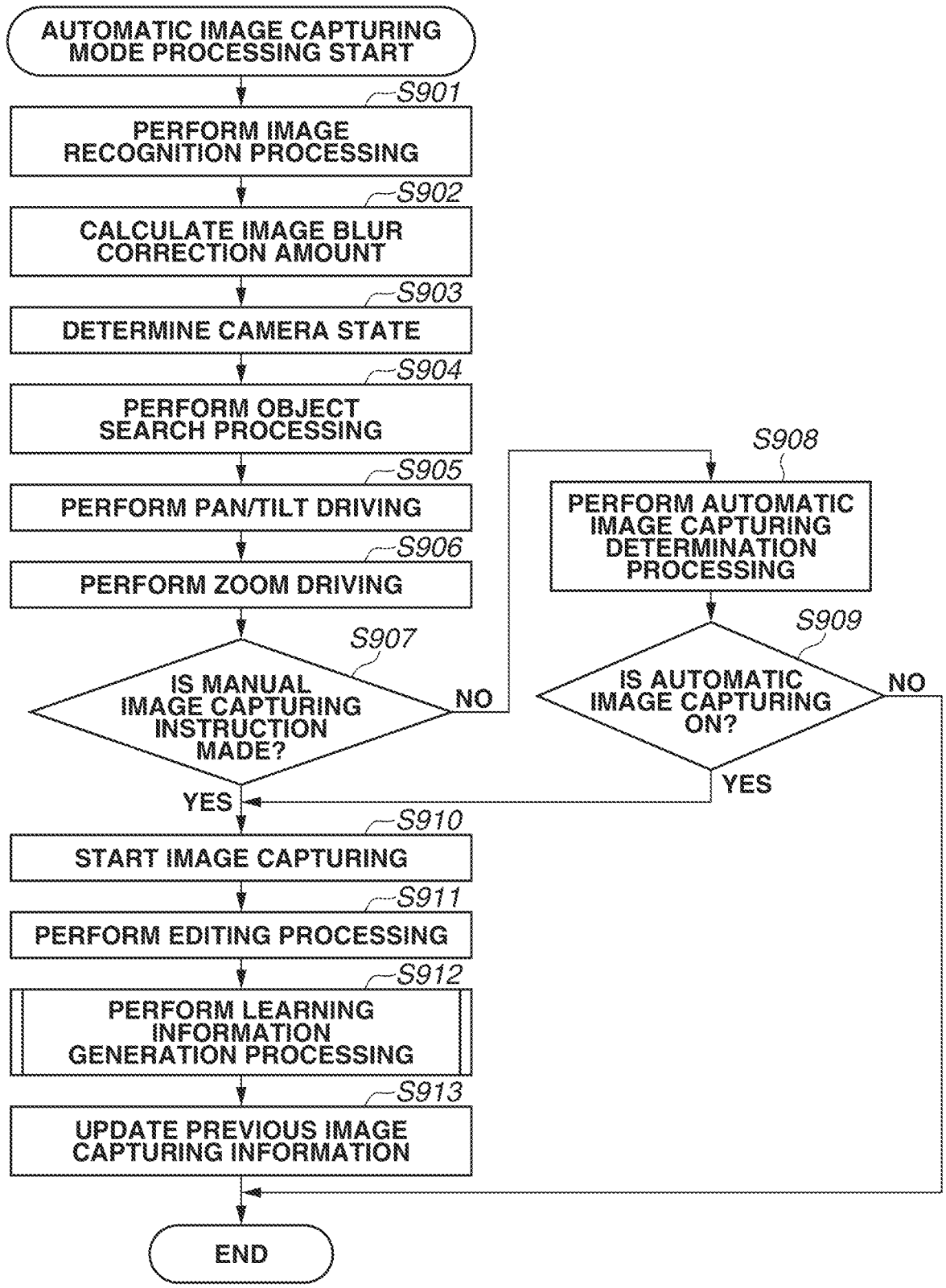
FIG. 9 is a flowchart illustrating a processing procedure in image capturing mode processing.

(1) Learning Based on Detected Information about when the Image Capturing Instruction is Issued by the User As described above with reference to steps S907 to S913 illustrated in FIG. 9, in the present exemplary embodiment, the image capturing apparatus 101 can perform two types of image capturing, i.e., manual image capturing and automatic image capturing. If the image capturing instruction (based on the three determinations as described above) is made by a manual operation in step S907, in step S912, information indicating that the captured image is a manually captured image is added. In a case where it is determined that automatic image capturing is ON in step S909 and image capturing is executed, in step S912, information indicating that the captured image is an automatically captured image is added.

In the case of performing manual image capturing, it is highly likely that image capturing may be performed based on the user's favorite object, the user's favorite scene, and the user's favorite location and time interval. Therefore, learning is performed based on each piece of characteristic data obtained during manual image capturing and learning information about captured images.

Next, learning in cooperation with an external communication device according to the present exemplary embodiment will be described.

Learning in cooperation with the external communication device according to the present exemplary embodiment includes the following method.

(2) Learning in Response to Acquiring of Images Using the External Communication Device As described above with reference to FIG. 3, the image capturing apparatus 101 and the external device 301 each have a configuration for establishing the communication 302 and the communication 303. Image transmission/reception is mainly performed by the communication 302. The external device 301 can acquire images stored in the image capturing apparatus 101 by the communication using a dedicated application in the external device 301. Further, the external device 301 can browse thumbnail images of image data stored in the image capturing apparatus 101 using a dedicated application. Thus, the user can select his/her favorite image from among the thumbnail images, check the image, and send an image acquisition instruction, so that the external device 301 can acquire the image.

In this process, since the user selects an image, and issues a transmission instruction, and the external device 301 acquires the image, it is highly likely that the acquired image may correspond to the user's favorite image. Therefore, it is determined that the acquired image is an image to be learned and the image is learned based on the learning information about the acquired image. Accordingly, various learning operations in accordance with the user's preference can be performed.

Figure 16:
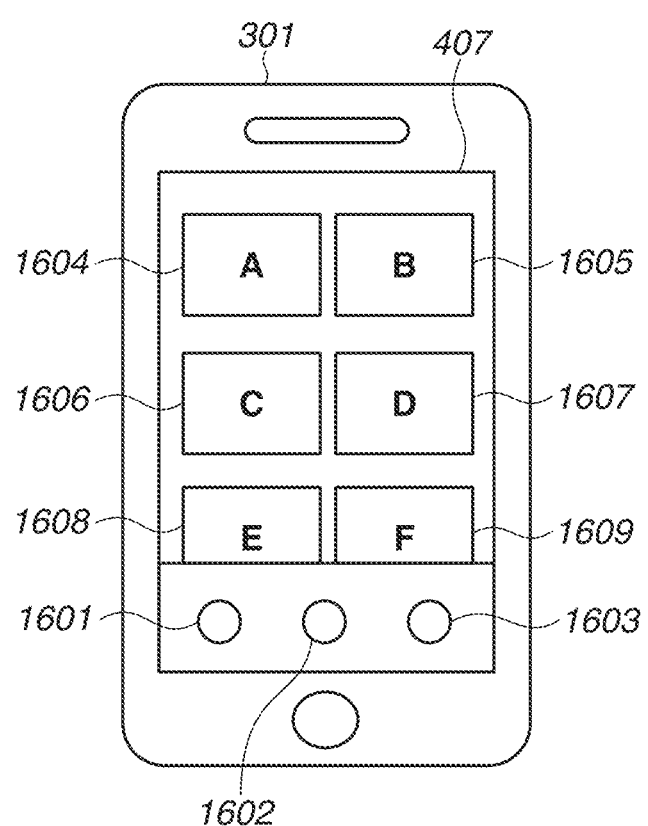
FIG. 16 is a diagram illustrating a state where images in the image capturing apparatus are browsed through an application in the external device.

An operation example will be described. FIG. 16 is a diagram illustrating an example in which images stored in the image capturing apparatus 101 are browsed through a dedicated application in the external device 301 which is a smart device. Thumbnail images (1604 to 1609) of image data stored in the image capturing apparatus 101 are displayed on the display apparatus 407. The user can select his/her favorite image and perform image acquisition. In this process, the display apparatus 407 has display method change portions (1601, 1602, and 1603) for changing the display method. When the display method change portion 1601 is pressed, the display order of images is changed to a date-and-time preference display mode, and the images are displayed on the display apparatus 407 in the order of image capturing date and time of images stored in the image capturing apparatus 101 (e.g., the images are displayed in reverse chronological order from the image 1604 with the newest image capturing date and time to the image 1609 with the oldest image capturing date and time). When the display method change portion 1602 is pressed, the display mode is changed to a recommended image preference display mode. Based on the score calculated and determined for each image in accordance with the user's preference in step S912 illustrated in FIG. 9, the images are displayed on the display apparatus 407 in descending order of score of each image in the image capturing apparatus 101 (e.g., the images are displayed in descending order of score from the image 1604 with the highest score to the image 1609 with the lowest score). When the display method change portion 1603 is pressed, a person or object can be designated. If a specific person or object is designated, the specific object can be displayed alone.

The settings indicated by the display method change portions 1601 to 1603 can be simultaneously turned on. For example, if all the settings are turned ON, only the designated object is displayed, and an image with a new image capturing date and time is preferentially displayed and an image with a high score is preferentially displayed.

Thus, since learning the user's preference for captured images has been performed, only the user's favorite image can be easily extracted from among a large number of captured images by a simple check operation.

(3) Learning in Response to a Change in Parameters in the External Communication Device As described above, the image capturing apparatus 101 and the external device 301 each include a communication unit and are capable of communicating learning parameters currently set in the image capturing apparatus 101 to the external device 301 and storing the learning parameters in the storage circuit 404 of the external device 301. Examples of the learning parameters may include the weight of the neural network, and selection of objects to be input to the neural network. Further, the learning parameters set in a dedicated server can be acquired via the public line control circuit 406 using a dedicated application in the external device 301 and can also be set as learning parameters in the image capturing apparatus 101. Thus, parameters obtained at a certain time are stored in the external device 301 and set in the image capturing apparatus 101. With this configuration, the learning parameters can be restored, or learning parameters owned by another user can be acquired through a dedicated server and the acquired learning parameters can be set in the image capturing apparatus 101.

Next, a learning processing sequence will be described.

In the mode setting determination in step S704 illustrated in FIG. 7, whether to perform learning processing is determined. In the case of performing learning processing, it is determined that the learning mode is set and then the learning mode processing in step S712 is performed.

Figure 14:
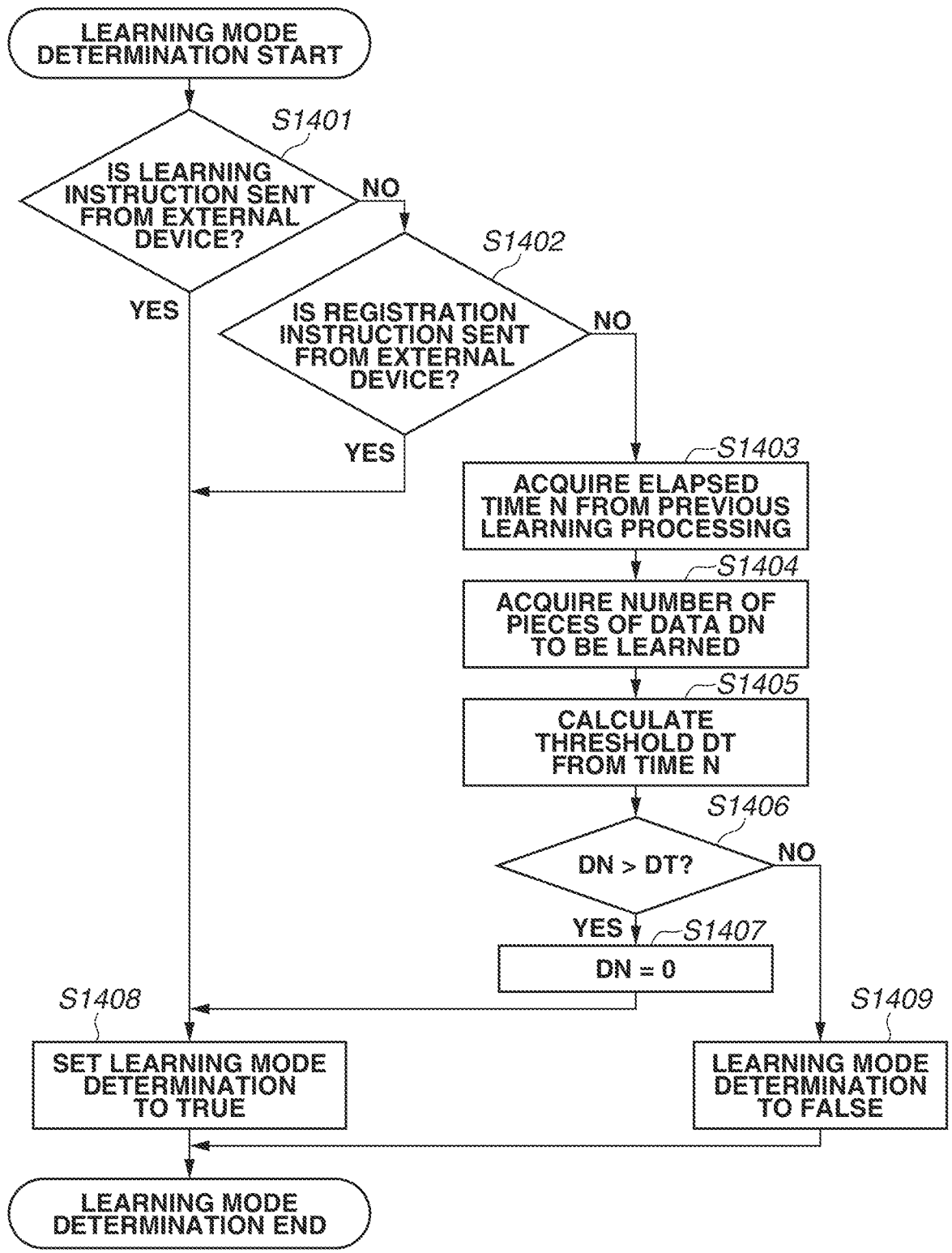
FIG. 14 is a flowchart illustrating a processing procedure in learning mode determination.

Learning mode determination conditions will be described. Whether to transition to the learning mode is determined based on an elapsed time from the time when the previous learning processing is performed, the number of pieces of information to be used for learning, and information indicating whether the learning processing instruction is issued via the communication device. FIG. 14 is a flowchart illustrating determination processing for determining whether to transition to the learning mode in the mode setting determination processing of step S704.

When an instruction to start the learning mode determination is issued in the mode setting determination processing of step S704, the processing illustrated in FIG. 14 is started. In step S1401, whether the learning instruction is sent from the external device 301 is determined. Specifically, it is determined whether an instruction to set a learning parameter is made, like in <learning in response to a change in the image capturing apparatus parameter in the communication device>. In step S1401, in a case where the learning instruction is sent from the external device 301 (YES in step S1401), the processing proceeds to step S1408. In step S1408, the learning mode determination is set to "TRUE" and a setting is made to perform the processing of step S712. In a case where the learning instruction is not sent from the external device 301 in step S1401 (NO in step S1401), the processing proceeds to step S1402. In step S1402, whether a registration instruction is sent from the external device 301 is determined. Specifically, it is determined whether an instruction to register a new image is issued, like in <learning in response to acquiring of images by the communication device>. In step S1402, in a case where the registration instruction is sent from the external device 301 (YES in step S1402), the processing proceeds to step S1408. In step S1408, the learning mode determination is set to "TRUE" and a setting is made to perform the processing of step S712, and then the learning mode determination processing is terminated. In step S1402, in a case where the registration is not sent from the external device 301 (NO in step S1402), the processing proceeds to step S1403.

In step S1403, an elapsed time N from the time when the previous learning processing (recalculation of the weight of the neural network) is performed is acquired, and then the processing proceeds to step S1404. In step S1404, a new data number DN (the number of images designated as images to be learned during the elapsed time N from the time when the previous learning processing is performed) of pieces of data to be newly learned is acquired, and then the processing proceeds to step S1405. To the new data number DN, the number of pieces of characteristic data newly added to the additional training data may be applied, or the number of times of manual image capturing may be simply applied. In step S1405, a threshold DT is calculated from the time N. For example, a threshold DTa, which is set when the time N is smaller than a predetermined value, is set to be greater than a threshold DTb which is set when the time N is greater than the predetermined value. Each threshold is set to be decreased with time. Thus, even in a case where the amount of learning data is small, if the elapsed time is large, learning is performed again to thereby facilitate the image capturing apparatus 101 to change the learning mode depending on an operating time.

After the threshold DT is calculated in step S1405, the processing proceeds to step S1406 to determine whether the data number DN of pieces of data to be learned is greater than the threshold DT. In a case where the data number DN is greater than the threshold DT (YES in step S1406), the processing proceeds to step S1407. In step S1407, the data number DN is set to "0", and then the processing proceeds to step S1408. In step S1408, the learning mode determination is set to "TRUE" and a setting is made to perform the processing of step S712, and then the learning mode determination processing is terminated.

In step S1406, in a case where the data number DN is less than or equal to the threshold DT (NO in step S1406), the processing proceeds to step S1409. In this case, neither the registration instruction nor the learning instruction is not sent from the external device 301, and the number of pieces of learning data is less than or equal to a predetermined value. Thus, the learning mode determination is set to "FALSE" to prevent the processing of step S712 from being performed, and then the learning mode determination processing is terminated.

Figure 15:
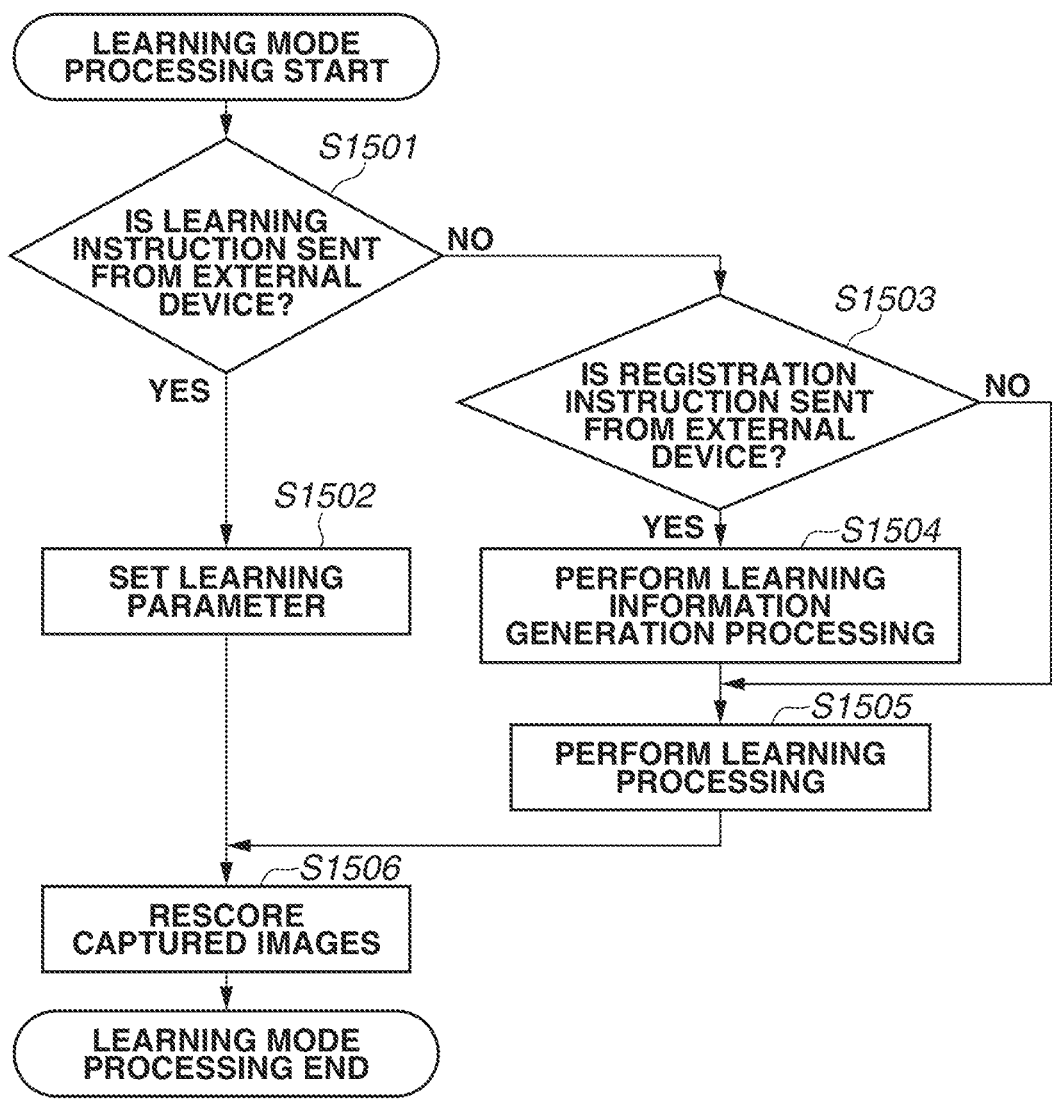
FIG. 15 is a flowchart illustrating a processing procedure in learning processing.

Next, processing in learning mode processing (step S712) will be described. FIG. 15 is a flowchart illustrating details of the learning mode processing.

In a case where it is determined that the learning mode is set in step S711 illustrated in FIG. 7 and the processing proceeds to step S712, the processing illustrated in FIG. 15 is started. In step S1501, whether the learning instruction is sent from the external device 301 is determined. In step S1501, in a case where the learning instruction is sent from the external device 301 (YES in step S1501), the processing proceeds to step S1502. In step S1502, the learning parameters communicated from the external device 301 are set to each determination unit (e.g., the weight of the neural network), and then the processing proceeds to step S1506.

In step S1501, in a case where the learning instruction is not sent from external device 301 (NO in step S1501), the processing proceeds to step S1503. In step S1503, whether the registration instruction is sent from the external device 301 is determined, in a case where the registration instruction is sent from the external device (YES in step S1503), the processing proceeds to step S1504. In a case where the registration instruction is not sent from the external device (NO in step S1503), the processing proceeds to step S1505. In step S1504, the learning information generation processing in steps S1202 to S1212 illustrated in in FIG. 12 is performed on the image acquired by the external device 301, and then the processing proceeds to step S1505. In the processing of step S1504, characteristic data that is determined to have a high priority level in the learning information generation processing among the characteristic data included in the image acquired by the external device 301 is added to the additional training data.

In step S1505, learning (recalculation of the weight of the neural network) is performed. Learning is performed again by a method such as an error back propagation method or a gradient decent method, and the weight of the neural network is recalculated to change the parameters for each determination unit. After the learning parameter is set, the processing proceeds to step S1506.

In step S1506, each image in a file is rescored. In the present exemplary embodiment, a score is added to all captured images stored in the file (recording medium 221) based on the learning result, and automatic editing processing or automatic file deletion processing is performed based on the added score. Accordingly, when re-learning and setting of learning parameters from the external device 301 are performed, the score of each captured image is also updated. Therefore, in step S1506, recalculation is performed to add a new score to each captured image stored in the file. After completion of the processing, the learning mode processing is terminated.

While the present exemplary embodiment has been described based on the configuration for performing learning in the image capturing apparatus 101, learning effects similar to those described above can also be obtained in a configuration in which the external device 301 includes a learning processing function, data to be used for learning is communicated to the external device 301, and only the external device 301 executes learning. In this case, as described above in <learning in response to acquiring of images by the communication device>, learning may be performed in response to setting of parameters, such as the weight of the neural network learned by the external device 301, in the image capturing apparatus 101 via communication.

Further, a configuration in which both the image capturing apparatus 101 and the external device 301 include a learning processing function may be employed. For example, learning information owned by the external device 301 may be communicated to the image capturing apparatus 101 at a timing when learning mode is performed in the image capturing apparatus 101, and learning may be performed using merged learning parameters.

While the exemplary embodiments described above illustrate a configuration in which the image capturing apparatus 101 includes the learning processing circuit 219 and the nonvolatile memory 216 for storing learning information, these components may be mounted on separate apparatuses and the apparatuses communicate each other. With this configuration, the separate apparatuses can function as a system for performing the processing described above.

The present disclosure can also be implemented by processing in which a program for implementing one or more functions according to the exemplary embodiments described above is supplied to a system or apparatus via a network or storage medium, and one or more processors in a computer of the system or apparatus read out the program and execute the program. The present disclosure can also be implemented by a circuit (e.g., an application specific integrated circuit (ASIC)) that implements one or more functions according to the exemplary embodiments described above.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2018-201266, filed Oct. 25, 2018, and No. 2019-176640, filed Sep. 27, 2019, which are hereby incorporated by reference herein in their entirety.

What is claimed is:

1. An information processing apparatus comprising:
a control circuit configured to access a memory storing training data to be used for a learning circuit to perform learning, and to update the training data in the memory,
wherein the memory stores first training data and second training data, the first training data and the second training data each including a plurality of pieces of characteristic data,
wherein the number of pieces of characteristic data included in the second training data has an upper limit, and
wherein the control circuit updates the second training data by setting a priority level to characteristic data extracted from an image and to the characteristic data included in the second training data, selecting the number of pieces of characteristic data corresponding to the upper limit from among the characteristic data, to which the priority level is set, in descending order of the priority level, and storing the selected characteristic data in the memory, without updating the first training data, and
decreases the priority level of characteristic data with an earlier date and time when an image corresponding to each of the plurality of pieces of characteristic data is captured among the characteristic data extracted from the image and the characteristic data included in the second training data.

2. The information processing apparatus according to claim 1, wherein the control circuit decreases a priority level of the characteristic data similar to the characteristic data included in the first training data among the extracted characteristic data and the characteristic data included in the second training data.

3. The information processing apparatus according to claim 1, wherein the control circuit changes the upper limit.

4. The information processing apparatus according to claim 3, wherein the control circuit changes the upper limit in response to an instruction from a user.

5. The information processing apparatus according to claim 1, wherein the control circuit extracts characteristic data from the image in a case where image capturing is performed in response to an instruction from a user.

6. The information processing apparatus according to claim 1, wherein the first training data is training data prepared before shipment, and the first training data is not updated with characteristic data from the image.

7. The information processing apparatus according to claim 1, further comprising the learning circuit.

8. The information processing apparatus according to claim 7, wherein the learning circuit performs learning using a neural network.

9. The information processing apparatus according to claim 7, further comprising a processing circuit configured to perform an image capturing operation using an image capturing apparatus based on a result of the learning by the learning circuit.

10. The information processing apparatus according to claim 9, wherein the processing circuit performs automatic image capturing based on a result of the learning by the learning circuit.

11. The information processing apparatus according to claim 9, further comprising the image capturing apparatus.

12. A control method for an information processing apparatus, comprising:
  accessing a memory configured to store training data to be used for a learning circuit to perform learning, and updating the training data,
  wherein the memory stores first training data and second training data, the first training data and the second training data each including a plurality of pieces of characteristic data,
  wherein the number of pieces of characteristic data included in the second training data has an upper limit, and
  wherein the first training data is not updated using characteristic data extracted from an image, and the second training data is updated by setting a priority level to characteristic data extracted from the image and to the characteristic data included in the second training data,
  selecting the number of pieces of characteristic data corresponding to the upper limit from among the characteristic data, to which the priority level is set, in descending order of the priority level,
  storing the selected characteristic data in the memory,
  and decreasing the priority level of characteristic data with an earlier date and time when an image corresponding to each of plurality of the pieces of characteristic data is captured among the characteristic data extracted from the image and the characteristic data included in the second training data.

13. A non-transitory memory which stores instructions that, when executed by one or more processing circuits of an information processing apparatus, causes the information processing apparatus to execute a control method, the control method comprising:
  accessing a memory configured to store training data to be used for a learning circuit to perform learning, and updating the training data,
  wherein the memory stores first training data and second training data, the first training data and the second training data each including a plurality of pieces of characteristic data,
  wherein the number of pieces of characteristic data included in the second training data has an upper limit, and
  wherein the first training data is not updated using characteristic data extracted from an image, and the second training data is updated by setting a priority level to characteristic data extracted from the image and to characteristic data included in the second training data,
  selecting the number of pieces of characteristic data corresponding to the upper limit from among the characteristic data, to which the priority level is set, in descending order of the priority level,
  storing the selected characteristic data in the memory,
  and decreasing the priority level of the characteristic data with an earlier date and time when an image corresponding to each of the plurality of pieces of characteristic data is captured among the characteristic data extracted from the image and the characteristic data included in the second training data.

* * * * *